United States Patent
Nomura et al.

(10) Patent No.: US 8,681,418 B2
(45) Date of Patent: Mar. 25, 2014

(54) LIGHT CONTROL FILM

(75) Inventors: Satoyuki Nomura, Tsukuba (JP); Yoshii Morishita, Tsukuba (JP); Tooru Tanaka, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/575,116

(22) PCT Filed: Jan. 26, 2011

(86) PCT No.: PCT/JP2011/051497
§ 371 (c)(1),
(2), (4) Date: Jul. 25, 2012

(87) PCT Pub. No.: WO2011/093339
PCT Pub. Date: Aug. 4, 2011

(65) Prior Publication Data
US 2012/0307348 A1 Dec. 6, 2012

(30) Foreign Application Priority Data

Jan. 26, 2010 (JP) ................................. 2010-014200

(51) Int. Cl.
G02B 26/00 (2006.01)
G09G 3/34 (2006.01)
(52) U.S. Cl.
USPC .......................................... 359/296; 345/107
(58) Field of Classification Search
USPC ........... 359/296; 345/105–107; 313/500–506, 313/509, 483; 445/24, 25, 58; 349/114
See application file for complete search history.

(56) References Cited

U.S. PATENT DOCUMENTS

| 1,955,923 A | 4/1934 | Land |
| 1,963,496 A | 6/1934 | Land |
| 2,041,138 A | 5/1936 | Land |
| 2,306,108 A | 12/1942 | Land |
| 2,375,963 A | 5/1945 | Thomas |

(Continued)

FOREIGN PATENT DOCUMENTS

| GB | 433455 | 1/1933 |
| JP | 63-68642 | 3/1988 |

(Continued)

OTHER PUBLICATIONS

International Preliminary Report on Patentability of Appln. No. PCT/JP2011/051497 dated Sep. 27, 2012 in English.

*Primary Examiner* — Loha Ben
(74) *Attorney, Agent, or Firm* — Antonelli, Terry, Stout & Kraus, LLP.

(57) ABSTRACT

Disclosed is a light control film comprising: two of transparent conductive resin substrates each having a transparent conductive layer and a transparent resin substrate; and a light control layer interposed between the two transparent conductive resin substrates to be in contact with the transparent conductive layer sides, the light control layer containing: a resin matrix; and a light control suspension dispersed in the resin matrix, wherein: the transparent conductive layer contains an organic binder resin, and conductive particles dispersed in the organic binder resin, the mass ratio of the organic binder resin and the conductive particles is 50/50 to 10/90, and the entirety or a portion of the organic binder resin is composed of (meth)acrylate containing a hydroxyl group. The present invention can provide a light control film having excellent radio wave transparency and having satisfactory adhesiveness between the light control layer and the transparent conductive layer.

6 Claims, 2 Drawing Sheets

(56) References Cited

U.S. PATENT DOCUMENTS

| | | | |
|---|---|---|---|
| 3,756,700 A | 9/1973 | Saxe | |
| 3,912,365 A | 10/1975 | Lowell | |
| 4,078,856 A | 3/1978 | Thompson et al. | |
| 4,247,175 A | 1/1981 | Saxe | |
| 4,270,841 A | 6/1981 | Saxe | |
| 4,273,422 A | 6/1981 | Saxe | |
| 4,407,565 A | 10/1983 | Saxe | |
| 4,422,963 A | 12/1983 | Thompson et al. | |
| 8,167,675 B2 * | 5/2012 | Yukinobu et al. | 445/24 |
| 2011/0310464 A1 * | 12/2011 | Nomura et al. | 359/296 |
| 2012/0314276 A1 * | 12/2012 | Nomura et al. | 359/296 |

FOREIGN PATENT DOCUMENTS

| | | |
|---|---|---|
| JP | 5-86972 | 12/1993 |
| JP | 2001-343909 | 12/2001 |
| JP | 2002-189123 | 7/2002 |
| JP | 2007-525686 | 9/2007 |
| JP | 2009-208542 | 9/2009 |
| JP | 2009-302029 | 12/2009 |
| WO | WO 2004/077649 A2 | 9/2004 |
| WO | WO 2008/075772 A1 | 6/2008 |

* cited by examiner

LIGHT CONTROL FILM

TECHNICAL FIELD

The present invention relates to a light control film having a light control function.

BACKGROUND ART

A light control glass containing a light control suspension was first invented by Edwin Land, and the light control glass is in the form of a structure in which a liquid-state light control suspension is inserted between two of transparent conductive substrates having a narrow gap therebetween (see, for example, Patent Documents 1 and 2). According to the invention by Edwin land, the liquid-state light control suspension inserted between the two transparent conductive substrates is such that when an electric field is not applied, as a result of the Brownian motion of light control particles that are dispersed in the suspension, most of the incident light rays are reflected, scattered or absorbed by the light control particles, and only a very small portion is transmitted.

That is, the extent of transmission, reflection, scattering or absorption can be determined on the basis of the shape, nature and concentration of the light control particles dispersed in the light control suspension, and the amount of light energy irradiated. When an electric field is applied to a light control window which uses a light control glass having the above-described structure, an electric field is formed in the light control suspension through the transparent conductive substrates, and the light control particles that exhibit a light control function cause polarization and are arranged in parallel to the electric field. Then, light is transmitted between light control particles, and eventually, the light control glass becomes transparent. However, such an initial light control apparatus had problems in practical use, such as the aggregation of the light control particles inside the light control suspension, sedimentation due to their own weights, color phase change due to heat, changes in the optical density, deterioration caused by ultraviolet ray irradiation, difficulties in keeping up the gap between the substrates and in the injection of the light control suspension into the gap, and others. Accordingly, it was difficult to put the light control apparatus to practical use.

Robert L. Saxe, F. C. Lowell, and R. I. Thompson have respectively disclosed light control windows making use of light control glasses for which the initial problems of light control windows, namely, the aggregation and sedimentation of light control particles, changes in the optical density, and the like have been compensated (see, for example, Patent Documents 3 to 9). In these patented inventions, those initial problems are solved by using a liquid-state light control suspension, which includes needle-shaped light control crystal particles, a suspending agent for dispersing crystal particles, a dispersion control agent, a stabilizer and the like, and preventing the sedimentation of light control particles by matching the densities of the light control particles and the suspending agent to be almost equal, while preventing the aggregation of the light control particles by adding a dispersion control agent to increase the dispersibility of the light control particles.

However, since even these light control glasses also have a structure in which a liquid light control suspension is encapsulated in a gap between two transparent conductive substrates as in the case of conventional light control glasses, there is a problem that, in the case of the manufacture of large-sized products, uniform encapsulation of the suspension in the gap between the two transparent conductive substrates is difficult, and a swelling phenomenon in the lower part is likely to occur due to the difference in the hydraulic pressure between the upper part and the lower part of the product. Furthermore, when the gap between the substrates is changed due to the external environment, for example, the pressure of wind, the optical density is changed as a result, so that the color phase becomes inhomogeneous. Further, there is a problem that the sealing material in the peripheral area for holding a liquid between the transparent conductive substrates is destroyed, and the light control material leaks out. In addition, unevenness occurs in the response time as a result of deterioration by ultraviolet ray, and a decrease in the voltage between the peripheral areas and the center of the transparent conductive substrates.

As a method of improving this, there has been suggested a method of mixing a liquid light control suspension with a solution of a curable polymer resin, and producing a film by using a phase separation method based on polymerization, a phase separation method based on solvent volatilization, a phase separation method based on temperature, or the like (see, for example, Patent Document 10).

Furthermore, in a space surrounded by the light control glasses used heretofore, since the transparent conductive resin substrates used in the glasses have small surface resistivity and low radio wave transparency, there is a problem that television sets, mobile telephones, remote control devices utilizing radio waves, and the like may not function adequately.

CITATION LIST

Patent Literatures

Patent Literature 1: U.S. Pat. No. 1,955,923
Patent Literature 2: U.S. Pat. No. 1,963,496
Patent Literature 3: U.S. Pat. No. 3,756,700
Patent Literature 4: U.S. Pat. No. 4,247,175
Patent Literature 5: U.S. Pat. No. 4,273,422
Patent Literature 6: U.S. Pat. No. 4,407,565
Patent Literature 7: U.S. Pat. No. 4,422,963
Patent Literature 8: U.S. Pat. No. 3,912,365
Patent Literature 9: U.S. Pat. No. 4,078,856
Patent Literature 10: Japanese Patent Application Laid-Open (JP-A) No. 2002-189123

SUMMARY OF THE INVENTION

Technical Problem

The present invention relates to a light control film used in the windowpanes or the like for use in vehicles such as automobiles, or in construction.

The light control films used in the windowpanes for use in vehicles such as automobiles, trains and airplanes or use in construction, have hitherto used existing transparent conductive layers having low electrical resistance, which are formed by a gas phase method such as sputtering or vapor deposition and are intended for touch screen panel applications or the like. However, since low electrical resistance is simultaneously accompanied by high radio wave reflectivity, there is a problem that television sets, mobile telephones, remote control devices utilizing radio waves, and the like do not function adequately when these have been brought into a car or into a room.

In order to decrease the radio wave shielding property, a method of increasing the surface resistivity of the transparent conductive layer is generally known. In order to increase the surface resistivity for the ITO that is formed into a film by a gas phase method such as vapor deposition or sputtering, a technique of reducing the thickness of the ITO film. However, when this technique is used, there is a problem that the fluctuation of the in-plane surface resistivity of ITO increases, so that it is difficult to achieve uniform driving of the light control films.

Furthermore, there are also problems with the adhesiveness between the transparent conductive layer and the transparent resin substrate of the transparent conductive resin substrate.

Solution to Problem

The inventors of the present invention conducted a thorough investigation, and as a result, they found that the problems described above can be solved by adopting a configuration in which conductive particles are dispersed in a particular organic binder, for the conductive layer of the transparent conductive resin substrate.

Specifically, the present invention relates to a light control film comprising: two of transparent conductive resin substrates each having a transparent conductive layer and a transparent resin substrate; and a light control layer interposed between the two transparent conductive resin substrates to be in contact with the transparent conductive layer sides, the light control layer containing: a resin matrix; and a light control suspension dispersed in the resin matrix, wherein: the transparent conductive layer contains an organic binder resin, and conductive particles dispersed in the organic binder resin, the mass ratio of the organic binder resin and the conductive particles is 50/50 to 10/90, and the entirety or a portion of the organic binder resin is composed of (meth)acrylate containing a hydroxyl group.

Furthermore, the present invention relates to a light control film such as described above, characterized in that the conductive particles are at least one selected from the group consisting of ITO, GZO, ZnO and Al-doped $SnO_2$.

The present invention also relates to a light control film such as described above, in which the organic binder resin is a resin obtainable by curing a polymerizable monomer or a polymerizable oligomer by heat or light.

Furthermore, the present invention relates to a light control film such as described above, in which the entirety or a portion of the organic binder resin is composed of a urethane acrylate containing a pentaerythritol skeleton.

The present invention also relates to a light control film such as described above, in which the transparent conductive layer is formed from a transparent conductive layer having a surface resistivity value of 1000Ω/□ or greater.

Furthermore, the present invention relates to a light control film such as described above, in which the radio wave shielding property in the frequency band of 500 MHz or higher is 5 dB or less.

Advantageous Effects of Invention

The light control film of the present invention is driven stably because the in-plane fluctuation of the surface resistivity of the transparent conductive layer is small, and also has excellent radio wave transparency, so that even inside a space surrounded by the light control film, television sets, mobile telephones, remote control devices utilizing radio waves, and the like can be made to function adequately.

Furthermore, when a particular organic binder resin is used, the adhesiveness between the transparent conductive layer and the transparent resin substrate of the transparent conductive resin substrate can be made satisfactory.

The disclosure of the present application relates to the subject matter described in Japanese Patent Application No. 2010-14200 filed on Jan. 26, 2010, the disclosure of which is incorporated herein by reference.

BEST MODES FOR CARRYING OUT THE INVENTION

Figure 1:
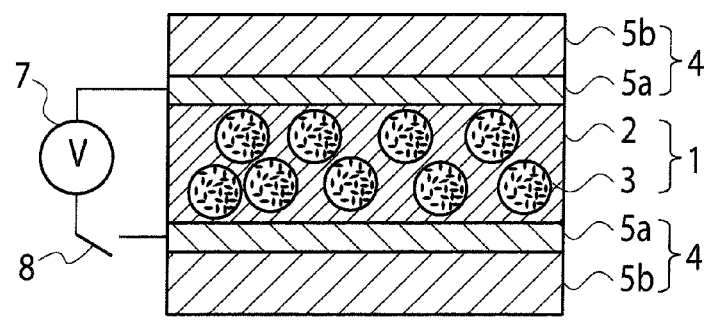
FIG. 1 is a schematic view of the cross-sectional structure of an embodiment of the light control film of the present invention.

That is, the light control film of the present invention is a light control film comprising: two transparent conductive resin substrates; and a light control layer interposed between the two transparent conductive resin substrate, the light control layer containing: a resin matrix; and a light control suspension dispersed in the resin matrix, characterized in that: the transparent conductive resin substrate has a transparent conductive layer on a resin substrate, the transparent conductive layer contains an organic binder resin and conductive particles dispersed in the organic binder resin, the mass ratio of the organic binder resin and the conductive particles is 50/50 to 10/90, and the entirety or a portion of the organic binder resin is composed of (meth)acrylate containing a hydroxyl group.

The light control layer can be generally formed by using a light control material. The light control material according to the present invention contains: as a resin matrix, a polymeric medium which is cured when irradiated with an energy beam; and a light control suspension in which light control particles are dispersed in a dispersion medium in a flowable state. It is preferable that the dispersion medium in the light control suspension be capable of phase separation from the polymeric medium and a cured product thereof.

When the light control material is used, and a light control layer in which a light control suspension is dispersed in a resin matrix formed from a polymeric medium, is interposed between two transparent conductive resin substrates each having a transparent conductive layer in which conductive particles are dispersed in an organic binder resin, to be in contact with the transparent conductive layer sides, the light control film of the present invention is obtained.

That is, in the light control layer of the light control film of the present invention, the liquid light control suspension is dispersed in the form of fine liquid droplets inside a solid resin matrix which is a cured product of the polymeric medium. The light control particles that are contained in the light control suspension are preferably rod-shaped or needle-shaped.

When an electric field is applied to such a light control film, the light control particles having an electric dipole moment, which are suspended and dispersed in the liquid droplets of the light control suspension dispersed in the resin matrix, are arranged in parallel to the electric field. Thereby, the liquid droplets are converted to a transparent state with respect to the incident light rays, and thus the light control film transmits the incident light rays in a state in which scattering due to the viewing angle, or a decrease in transparency is almost absent.

According to the present invention, the surface resistivity can be increased by adopting a transparent conductive layer in which conductive particles are dispersed in a particular organic binder resin, and the conventional problems of light control films, that is, the problems that inside a space surrounded by a light control film, television sets, mobile telephones, remote control devices utilizing radio waves, or the like do not function adequately, and the use of ETC is restricted, are solved, since the radio wave transparency is small.

Furthermore, when a particular organic binder resin is used, the adhesiveness between the transparent conductive layer and the transparent resin substrate of the transparent conductive resin substrate can be made satisfactory.

According to the present invention, it is preferable that the transparent conductive layer contains: as constituent components, conductive particles; and an organic binder resin formed from a polymerizable monomer or a polymerizable oligomer. In order to increase the adhesiveness between the transparent resin substrate and the transparent conductive layer, it is important that the entirety or a portion of this organic binder resin be composed of (meth)acrylate containing a hydroxyl group. Furthermore, it is preferable that this organic binder resin (the entirety of the organic binder resin containing the (meth)acrylate containing the hydroxyl group and the like) be a resin obtainable by curing a polymerizable monomer or a polymerizable oligomer with heat or light. Furthermore, it is also preferable to use a urethane acrylate containing a pentaerythritol skeleton in place of, or in combination with, the (meth)acrylate containing the hydroxyl group.

The mass ratio of the organic binder resin and the conductive particles is preferably in the range of 50/50 to 10/90.

Furthermore, the surface resistivity of the transparent conductive layer is preferably 1000Ω/□ or greater, and more preferably 2000Ω/□ or greater.

Furthermore, the radio wave shielding property of this light control film is preferably 5 dB or less, and more preferably 3 dB or less, in the frequency band of 500 MHz or higher.

Hereinafter, each layer configurations and the light control film will be described.

<Transparent Conductive Substrate>

As the transparent conductive resin substrate used in the case of producing a light control film using the light control material according to the present invention, use can be made of a transparent conductive resin substrate which has a transparent resin substrate coated with a transparent conductive layer containing an organic binder resin and conductive particles, and having a combined light transmittance of the transparent resin substrate and the transparent conductive layer is 80% or greater. Meanwhile, the light transmittance can be measured according to the method for measuring the total light transmittance of JIS K7105.

(Transparent Conductive Layer)

First, the material used in the transparent conductive layer according to the present invention will be described. The transparent conductive layer has conductive particles dispersed in an organic binder resin, and is formed from a coating material in which conductive particles are dispersed in an organic binder resin. The coating material is preferably a coating material in which a mixture of conductive particles and an organic binder resin formed from a polymerizable monomer or a polymerizable oligomer is dispersed in an organic solvent or the like, and the transparent conductive layer is more preferably a thin film obtainable by curing a polymerizable monomer or a polymerizable oligomer (including the (meth)acrylate containing the hydroxyl group and the like) that constitutes the organic binder resin in the transparent conductive layer, with light or heat.

Meanwhile, in order to increase the adhesiveness between the transparent resin substrate and the transparent conductive layer, it is important that the entirety or a portion of this organic binder resin be composed of the (meth)acrylate containing the hydroxyl group. Furthermore, it is also preferable to use the urethane acrylate containing the pentaerythritol in place of, or in combination with, the (meth)acrylate containing the hydroxyl group.

The content of the (meth)acrylate containing the hydroxyl group or the urethane acrylate containing the pentaerythritol skeleton relative to the total amount of the organic binder resin is preferably 60% by mass or greater, and more preferably 80% by mass or greater.

The conductive particles according to the present invention are preferably at least one selected from the group consisting of ITO, GZO, ZnO and Al-doped $SnO_2$.

The transparent conductive layer has conductive particles dispersed in the organic binder resin, and is characterized in that the mass ratio of the organic binder resin and the conductive particles is 50/50 to 10/90. More preferably, the mass ratio of the organic binder resin and the conductive particles is 30/70 to 10/90.

When the mass ratio of the organic binder resin and the conductive particles in the transparent conductive layer is in the range described above, a good balance can be achieved between high surface resistivity and high adhesiveness, and thus it is preferable.

The average particle size of the conductive particles is preferably in the range of 10 nm to 500 nm from the viewpoint of transparency, and is more preferably in the range of 10 nm to 200 nm. If the average particle size is less than 10 nm, the dispersion of the conductive particles may be difficult.

The average particle size of the conductive particles is the particle size calculated from the specific surface area measured with a specific surface area analyzer according to the BET method, using the following formula.

$$\text{Average particle size(nm)} = 6000/(\text{density [g/cm}^3\text{]} \times \text{specific surface area [m}^2/\text{g]})$$

For the conductive particles having an average particle size in the range described above, commercially available products may be appropriately selected.

Among the conductive particles described above, a conductive ITO powder is preferred from the viewpoint of being industrially easily available. As the conductive ITO powder used in the present invention, commercially available products may be used, or the conductive ITO powder can be produced by a known method comprising the steps of: neutralizing an acidic solution prepared by dissolving the respective chlorides of tin and indium, with an alkali; co-precipitating the hydroxides of tin and indium; and calcining this coprecipitation product. The content of tin with respect to indium is preferably in the range of 1% to 15% by mole, from the viewpoint of conductivity.

Furthermore, the average particle size of the conductive ITO powder is preferably in the range of 10 nm to 500 nm from the viewpoint of transparency, and is more preferably in the range of 10 nm to 200 nm. If the average particle size is less than 10 nm, the dispersion of the conductive ITO powder may be difficult.

In order to increase the adhesiveness with the transparent resin substrate, the material of item (a) described below is used for the entirety or a portion of the organic binder resin of the transparent conductive layer is used. In the present patent application, it is important that the entirety or a portion of the organic binder resin be composed of (meth)acrylate containing a hydroxyl group, in order to increase the adhesiveness between the transparent resin substrate and the transparent conductive layer. Furthermore, the material of item (b) may also be used in place of, or in combination with, the material of item (a), and the material of item (c) may also be further used in combination.

(a) A material containing a (meth)acrylate containing a hydroxyl group in the molecule.

(b) A material containing a urethane acrylate containing a pentaerythritol skeleton.

(c) A phosphoric acid ester having one or more polymerizable groups in the molecule.

Each material will be described below, (a) Material Containing the (Meth)Acrylate Containing the Hydroxyl Group in Molecule Specific examples of the (meth)acrylate containing the hydroxyl group in the molecule that is used in the formation of a transparent conductive layer include compounds represented by (formula 1) to (formula 8), but the present invention is not intended to be limited to these examples.

The (meth)acrylate containing the hydroxyl group is also preferably a (meth)acrylate containing a hydroxyl group and a pentaerythritol skeleton. Meanwhile, the "(meth)acrylate containing the hydroxyl group and the pentaerythritol skeleton" is such that if the hydroxyl group is present in the (meth)acrylate molecule, the hydroxyl groups of pentaerythritol may be all substituted, but preferably, the relevant compound means that at least one hydroxyl group of pentaerythritol is unsubstituted.

The pentaerythritol skeleton will be described in the paragraph for the material (b) such as described below.

[Chemical Formula 1]

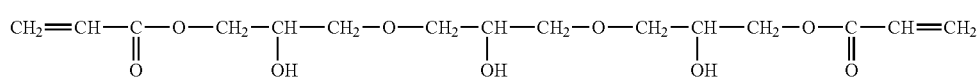
(Formula 1)

[Chemical Formula 2]

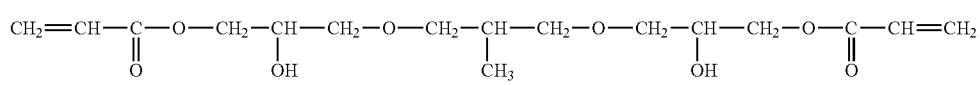
(Formula 2)

[Chemical Formula 3]

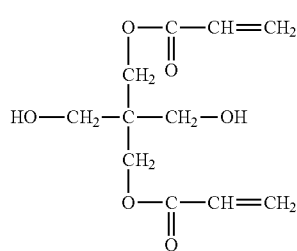
(Formula 3)

[Chemical Formula 4]

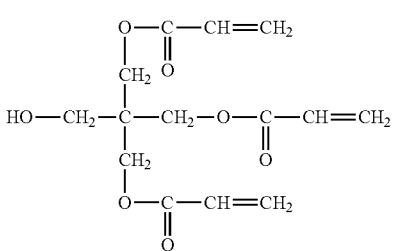
(Formula 4)

[Chemical Formula 5]

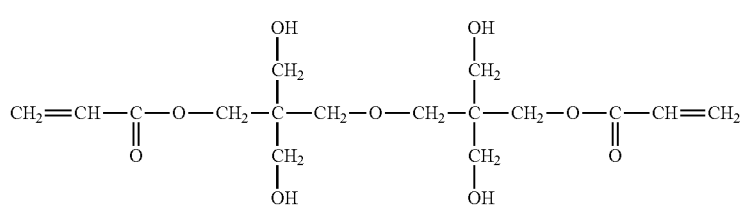
(Formula 5)

[Chemical Formula 6]

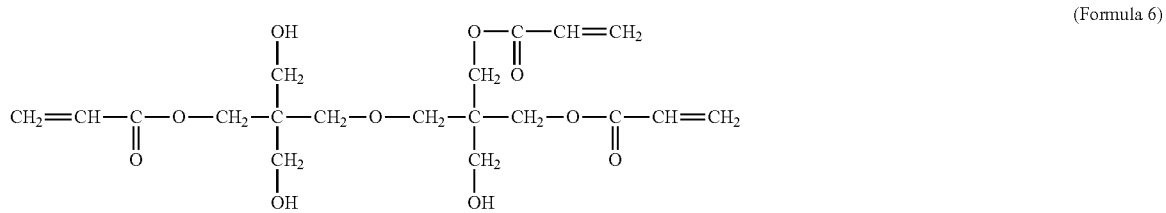
(Formula 6)

[Chemical Formula 7]

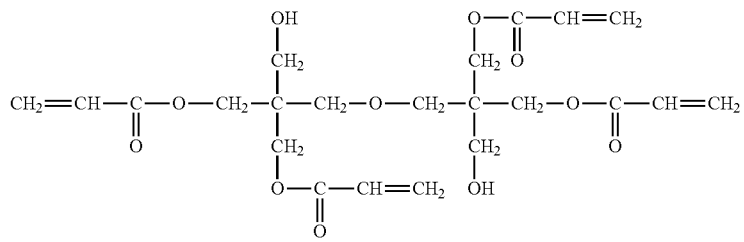

(Formula 7)

[Chemical Formula 8]

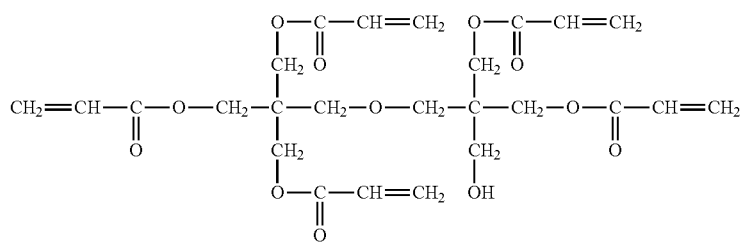

(Formula 8)

Preferred examples of the (meth)acrylate containing the hydroxyl group in the molecule include, as shown in the formula 3 to formula 8, (meth)acrylates further containing a pentaerythritol skeleton.

The (meth)acrylate containing the hydroxyl group in the molecule that is used in the present invention can be synthesized by a known method. For example, in the case of an epoxy ester, the compound can be obtainable by allowing an epoxy compound and (meth)acrylic acid to react in the presence of an esterification catalyst and a polymerization inhibitor in an inert gas.

Examples of the inert gas include nitrogen, helium, argon, and carbon dioxide. These can be used singly or in combination.

Examples of the esterification catalyst that can be used include compounds containing tertiary amine such as triethylamine, pyridine derivatives and imidazole derivatives; phosphorus compound such as trimethylphosphine and triphenylphosphine; and amine salts such as tetramethylammonium chloride and triethylamine. The amount of addition is in the range of 0.000001% to 20% by mass, and preferably in the range of 0.001% to 1% by mass.

As the polymerization inhibitor, polymerization inhibitors that are known per se, such as hydroquinone and tertiary butylhydroquinone are used. The amount of use is selected in the range of 0.000001% to 0.1% by mass.

Examples of the epoxy ester include 2-hydroxy-3-phenoxypropyl acrylate (trade name: ARONIX M-5700, manufactured by Toagosei Co., Ltd., or trade name: EPOXY ESTER M-600A, manufactured by Kyoeisha Chemical Co., Ltd.); 2-hydroxy-3-acryloyloxypropyl methacrylate (trade name: LIGHT ESTER G-201P manufactured by Kyoeisha Chemical Co., Ltd.); and diglycidyl ether (meth)acrylic acid adducts such as glycerin diglycidyl ether acrylic acid adduct and propylene glycol diglycidyl ether acrylic acid adduct (trade name: EPOXY ESTER 80MFA (glycerin diglycidyl ether acrylic acid adduct), EPOXY ESTER 40EM (ethylene glycol diglycidyl ether methacrylic acid adduct), EPOXY ESTER 70PA (propylene glycol diglycidyl ether acrylic acid adduct), EPOXY ESTER 200PA (tripropylene glycol diglycidyl ether acrylic acid adduct), EPOXY ESTER 3002M (bisphenol A propylene oxide 2-mol adduct diglycidyl ether methacrylic acid adduct), EPOXY ESTER 3002A (bisphenol A propylene oxide 2-mol adduct diglycidyl ether acrylic acid adduct), EPOXY ESTER 3000 MK (bisphenol A diglycidyl ether methacrylic acid adduct), and EPOXY ESTER 3000A (bisphenol A diglycidyl ether acrylic acid adduct) (all manufactured by Kyoeisha Chemical Co., Ltd.)).

Furthermore, in the case of the (meth)acrylate containing the hydroxyl group and the pentaerythritol skeleton, the compound can be obtained by allowing pentaerythritol, dipentaerythritol or the like to react with acrylic acid or methacrylic acid in air in the presence of an esterification catalyst and a polymerization inhibitor. As the reaction method for adding acrylic acid or methacrylic acid to pentaerythritol or dipentaerythritol, known methods that are described in Japanese Patent Application (JP-B) No. 5-86972 and JP-A No. 63-68642 can be applied.

Examples of commercially available products of the (meth)acrylate containing the hydroxyl group in the molecule include, in particular, LIGHT ESTER HOP, LIGHT ESTER HOA, LIGHT ESTER HOP-A, LIGHT ESTER HOB, LIGHT ESTER HO-MPP, LIGHT ESTER P-1M, LIGHT ESTER P-2M, LIGHT ESTER G-101P, LIGHT ESTER G-201P, LIGHT ESTER HOB-A, LIGHT ESTER HO-HH, LIGHT ACRYLATE HOA-HH, HOA-MPL, HOA-MPE, LIGHT ACRYLATE P-1A, and LIGHT ACRYLATE PE-3A (all manufactured by Kyoeisha Chemical Co., Ltd.); ARONIX M-215, ARONIX M-305, ARONIX M-306, ARONIX M-451, ARONIX M-403, ARONIX M-400, ARONIX M-402, ARONIX M-404, and ARONIX M-406 (all manufactured by Toagosei Co., Ltd.).

(b) Material Containing the Urethane Acrylate Containing the Pentaerythritol Skeleton Here, the term "pentaerythritol skeleton" indicates a structure represented by the following formula (a). The "urethane acrylate containing the pentaerythritol skeleton" specifically has a structure in which at least one hydrogen of the hydroxyl group of pentaerythritol present in the molecule of urethane acrylate is substituted by a carbamoyl group, and at least one hydroxyl group is esterified with (meth)acrylic acid. At this time, the carbamoyl group and the (meth)acrylic acid may also have substituents. Meanwhile, it is not necessary that the hydroxyl group substituted with a carbamoyl group and the hydroxyl group esterified with (meth)acrylic acid be hydroxyl groups that are bonded to the same pentaerythritol skeleton represented by the following (formula a).

[Chemical Formula 9]

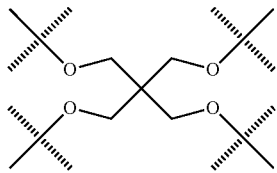

(Formula a)

Furthermore, it is also preferable that the urethane acrylate containing the pentaerythritol skeleton according to the present invention have dipentaerythritol in which two pentaerythritols are linked through an oxygen atom, as the pentaerythritol skeleton. In that case as well, at least one hydrogen atom of the hydroxyl group of pentaerythritol is substituted by a carbamoyl group, and at least one hydroxyl group is esterified with (meth)acrylic acid. At this time, the carbamoyl group and the (meth)acrylic acid may also have substituents.

Furthermore, it is more preferable that the urethane acrylate also contains IPDI (3-isocyanatomethyl-3,5,5-trimethylcyclohexyl isocyanate) at the same time. Furthermore, it is preferable that this urethane acrylate further contains a hydroxyl group in the molecule.

Here, the "IPDI (3-isocyanatomethyl-3,5,5-trimethylcyclohexyl isocyanate) skeleton" means a structure represented by the following (formula b).

[Chemical Formula 10]

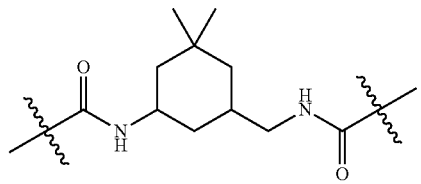

(Formula b)

Specific examples of the urethane acrylate containing the pentaerythritol skeleton, and preferably, the urethane acrylate containing the pentaerythritol skeleton and the IPDI skeleton, include compounds represented by the following (formula 9) to (formula 15).

[Chemical Formula 11]

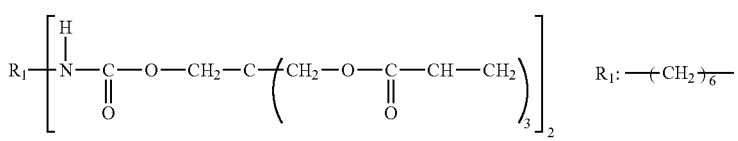

(Formula 9)

[Chemical Formula 12]

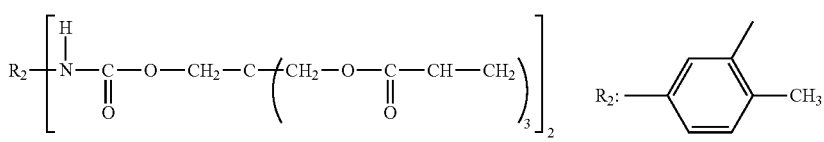 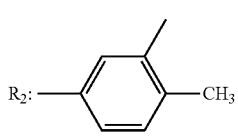

(Formula 10)

[Chemical Formula 13]

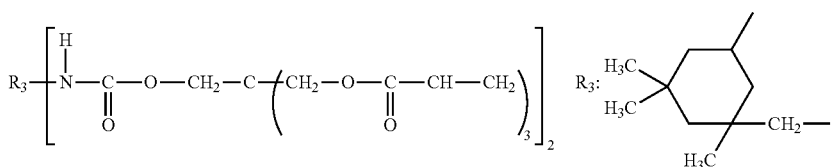 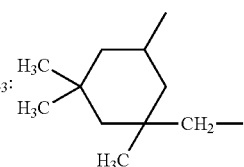

(Formula 11)

[Chemical Formula 14]

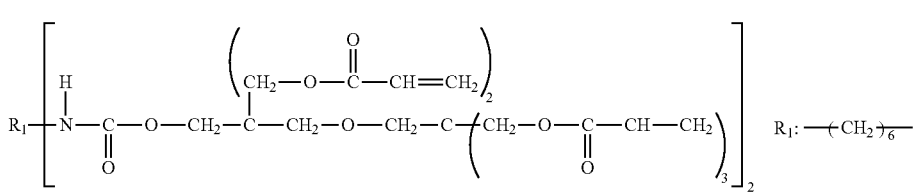 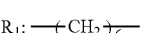

(Formula 12)

[Chemical Formula 15]

(Formula 13)

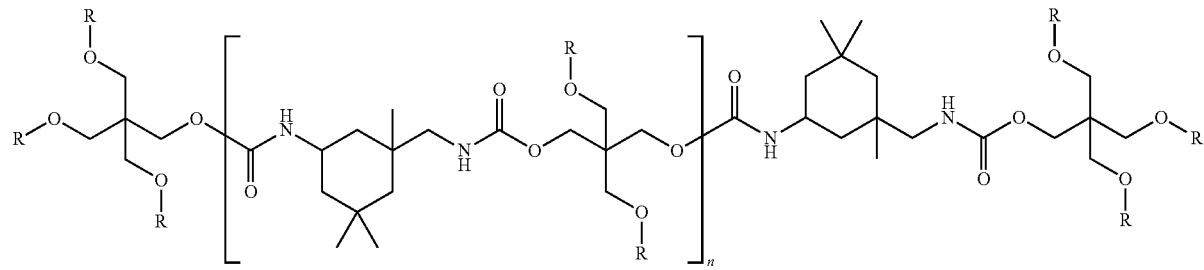

[Chemical Formula 16]

(Formula 14)

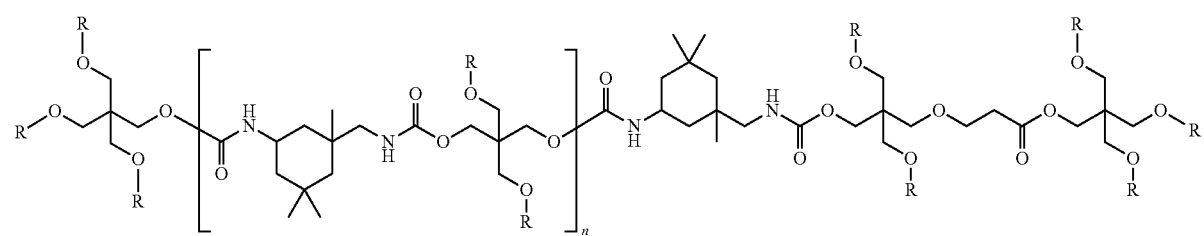

[Chemical Formula 17]

(Formula 15)

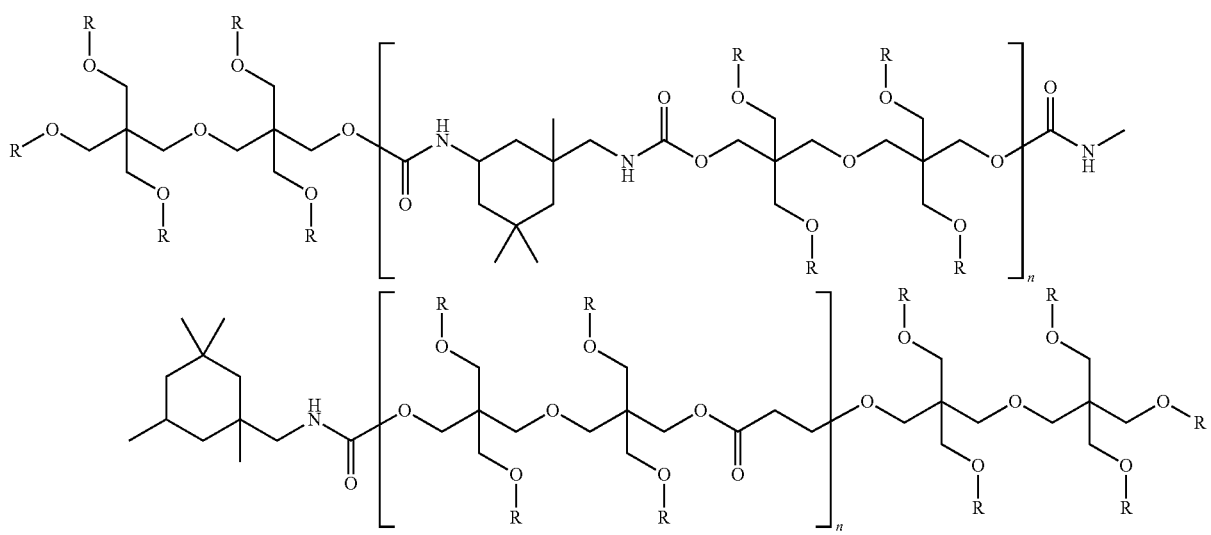

Meanwhile, R in the (formula 13) to (formula 15) may all be identical with or different from each other, and represent the moiety shown below. It is preferable the at least one or more be H.

[Chemical Formula 18]

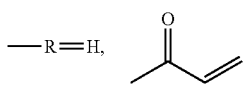

The urethane acrylate containing the pentaerythritol skeleton can be synthesized by a known method. For example, since urethane acrylate is generally obtainable by allowing the hydroxyl group of a polyol compound, a polyisocyanate compound or the like to react with a (meth)acrylate containing a hydroxyl group by a known method, the urethane acrylate containing the pentaerythritol skeleton can be similarly produced by, for example, any one of the following production method 1 to production method 4.

(Production Method 1): A method of introducing a polyol compound, a polyisocyanate compound and a (meth)acrylate containing a pentaerythritol skeleton all together and allowing the mixture to react.

(Production Method 2): A method of allowing a polyol compound and a polyisocyanate compound to react, and then allowing the resulting product to react with a (meth)acrylate containing a pentaerythritol skeleton.

(Production Method 3): A method of allowing a polyisocyanate compound and a (meth)acrylate containing a pentaerythritol skeleton to react, and then allowing the resulting product to react with a polyol compound.

(Production Method 4): A method of allowing a polyisocyanate compound and a (meth)acrylate containing a pentaerythritol skeleton to react, subsequently allowing the resulting product to react with a polyol compound, and finally allowing the resulting product to react with a (meth)acrylate containing a pentaerythritol skeleton.

Furthermore, these reactions may be carried out using a catalyst, and for example, tin-based catalysts such as dibutyltin laurate, and tertiary amine-based catalysts are used.

Examples of the (meth)acrylate containing the pentaerythritol skeleton used in the production method 1 to production method 4 include (meth)acrylates containing the hydroxyl group such as pentaerythritol diacrylate, pentaerythritol triacrylate, dipentaerythritol pentaacrylate, and dipentaerythritol tetraacrylate.

Examples of the polyisocyanate compound used in the production method 1 to production method 4 include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenyhlmethane diisocyanate, 4,4'-diphenylmethane diisocyanate, 3,3'-diphenylmethane diisocyanate, 4,4'-biphenylene diisocyanate, 1,6-hexane diisocyanate, isophorone diisocyanate (3-isocyanatomethyl-3,5,5-trimethylcyclohexyl isocyanate), methylenebis(4-cyclohexyl isocyanate), 2,2,4-trimethylhexamethylene diisocyanate, 1,4-hexamethylene diisocyanate, bis(2-isocyanatoethyl) fumarate, 6-isopropyl-1,3-phenyl diisocyanate, 4-diphenylpropane diisocyanate, and lysine diisocyanate.

As the urethane acrylate containing the pentaerythritol skeleton, commercially available products containing the urethane acrylate containing the pentaerythritol skeleton can also be used, and examples thereof include UA-306H, UA-3061, UA-306T, and UA-510H (manufactured by Kyoeisha Chemical Co., Ltd.); and HA-7903-11 (manufactured by Hitachi Chemical Co., Ltd.).

The urethane acrylate containing both the pentaerythritol skeleton and the IPDI skeleton can be obtainable by using isophorone diisocyanate as the polyisocyanate compound in the production method 1 to production method 4 described above.

Furthermore, commercially available products can also be used, and specific examples of the commercially available products containing the urethane acrylate containing both the pentaerythritol skeleton and the IPDI skeleton include the following.

Examples thereof include AY42-151 (containing SiO$_2$ fine particles as a filler, manufactured by Dow Corning Toray Silicone Co., Ltd.), UVHC3000 (containing no filler, manufactured by Momentive Performance Materials, Inc.), and UVHC7000 (containing no filler, manufactured by Momentive Performance Materials, Inc.).

(c) Phosphoric Acid Ester Having One or More Polymerizable Groups in Molecule

An example of the material which can be used in the combination used of the (a) material for forming the transparent conductive layer, may be a phosphoric acid ester having one or more polymerizable groups in the molecule, and preferred examples thereof include phosphoric acid monoesters or phosphoric acid diesters, each having one or more polymerizable groups in the molecule. A phosphoric acid ester having one or more polymerizable groups in the molecule usually has the polymerizable group(s) in the ester moiety, and preferably has one polymerizable group in one ester moiety. The number of polymerizable groups in the molecule is preferably one or two. Furthermore, the phosphoric acid ester preferably has a (poly)alkylene oxide structure such as (poly)ethylene oxide or (poly)propylene oxide in the molecule.

The polymerizable group is preferably a group which is polymerized when irradiated with an energy beam, and examples thereof include groups having ethylenically unsaturated double bonds, such as a (meth)acryloyloxy group.

More specifically, the material for forming the transparent conductive layer is preferably a phosphoric acid monoester or a phosphoric acid diester, each having the (meth)acryloyloxy group in the molecule.

Examples of the phosphoric acid monoester or phosphoric acid diester, each having the (meth)acryloyloxy group, include compounds represented by (formula 16) or (formula 17).

[Chemical Formula 19]

(Formula 16)

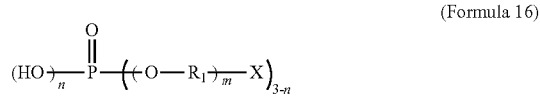

wherein $R_1$s is each independently represent a linear or branched alkylene group having 1 to 4 carbon atoms; m represents an integer of 1 or greater; n represents 1 or 2; and Xs are each independently selected from the following:

[Chemical Formula 20]

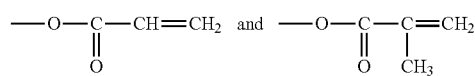

m is preferably 1 to 10, and more preferably 1 to 6.

[Chemical Formula 21]

(Formula 17)

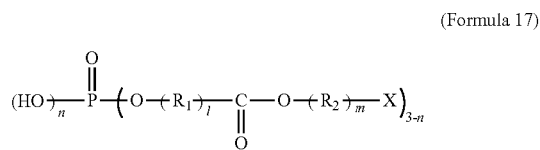

wherein $R_1$ and $R_2$ each independently represent a linear or branched alkylene group having 1 to 4 carbon atoms; l and m each independently represent an integer of 1 or greater; n represents 1 or 2; and Xs are each independently selected from the following:

[Chemical Formula 22]

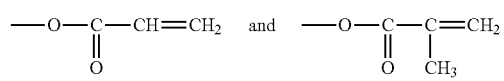

l is preferably 1 to 10, and more preferably 1 to 5. m is preferably 1 to 5, and more preferably 1 to 2.

Furthermore, these phosphoric acid monoesters or phosphoric acid diesters, each having the (meth)acryloyloxy group, may be used as mixtures, or may also be used as mixtures with other (meth)acrylates and the like.

Commercially available products of the phosphoric acid monoesters or phosphoric acid diesters, each having the (meth)acryloyloxy group, include PM-21 represented by the following formula (c) (manufactured by Nippon Kayaku Co., Ltd.); PHOSMER PP represented by the following formula (d), PHOSMER PE represented by the following formula (e), and PHOSMER M represented by the following formula (f) (all manufactured by Unichemical Co.); P-1M represented by the following formula (g), and P-2M represented by the following formula (h) (all manufactured by Kyoeisha Chemical Co., Ltd.). Meanwhile, in regard to PHOSMER M and P-1M, the phosphoric acid esters that are contained as main ingredients are the same compounds, as shown in the following formulas.

anediol dimethacrylate, 1,9-nonanediol dimethacrylate, 1,10-decanediol dimethacrylate, dimethyloltricyclodecane dimethacrylate, dimethacrylates of ethylene oxide adducts of bisphenol A, trimethylolpropane trimethacrylate, triethylene glycol diacrylate, tetraethylene glycol diacrylate, nonaethylene glycol diacrylate, tetradecaethylene glycol diacrylate, polytetramethyelne glycol diacrylate, neopentyl glycol diacrylate, 3-methyl-1,5-pentanediol diacrylate, 1,6-hexanediol diacrylate, 2-butyl-2-ethyl-1,3-propanediol diacrylate, 1,9-nonanediol diacrylate, dimethyloltricyclodecane diacrylate, diacrylates of ethylene oxide adducts of bisphenol A, diacrylates of propylene oxide adducts of bisphenol A, trimethylol-

[Chemical Formula 23]

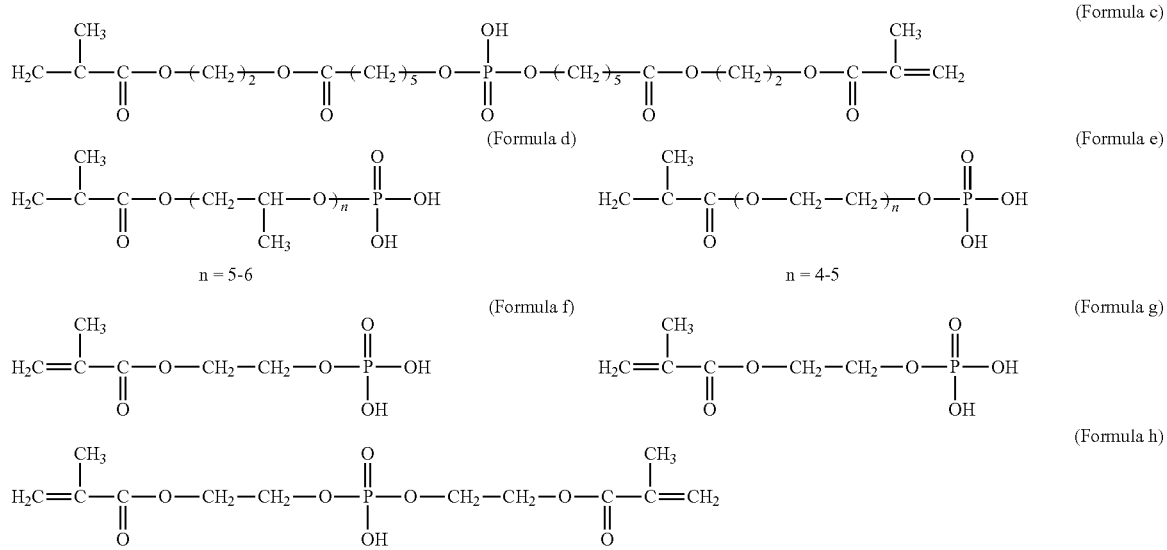

The organic binder resin is used in combination with the material of the above item (a), and more preferably used in combination with the material of the above item (a) and the materials of the items (b) and (c). An epoxy resin, a phenoxy resin, a polyvinyl butyral resin and the like can also be used. These may be used singly or as mixtures. Meanwhile, the present invention is not intended to be limited to these examples. In addition, the material of item (b) can be used instead of the material of item (a).

Examples of commercially available products of these resins include a bisphenol AF copolymer phenoxy resin ZX1356-2, a phenoxy resin PKHC (all manufactured by Union Carbide Corp.), and a polyvinyl butyral resin 3000K (manufactured by Denki Kagaku Kogyo K.K.).

As the organic binder resin, a polymerizable monomer or a polymerizable oligomer can also be used in combination use of the material of the above item (a), preferably can used in combination with the materials of the above items (b) to (c) as well as the material of the above item (a). Examples of the polymerizable monomer or the polymerizable oligomer include (meth)acrylates.

Specific examples of the (meth)acrylates as the polymerizable monomer or the polymerizable oligomer include ethylene glycol dimethacrylate, diethylene glycol dimethacrylate, triethylene glycol dimethacrylate, tetraethylene glycol dimethacrylate, nonaethylene glycol dimethacrylate, tetradecaethylene glycol dimethacrylate, 1,4-butanediol dimethacrylate, neopentyl glycol dimethacrylate, 1,6-hex-propane acrylic acid benzoic acid ester, hydroxypivalic acid neopentyl glycol diacrylate, trimethylolpropane triacrylate, ethylene oxide-modified trimethylolpropane triacrylate, propylene oxide-modified trimethylolpropane triacrylate, pentaerythritol tetraacrylate, dipentaerythritol hexaacrylate, isocyanuric acid ethylene oxide-modified triacrylate, polypropylene glycol diacrylate, polyethylene glycol diacrylate, ε-caprolactone-modified tris(acroxyethyl) isocyanurate, and phenyl glycidyl ether acrylate urethane prepolymers, and these may be used singly or as mixtures. Meanwhile, the present invention is not intended to be limited to these examples.

Commercially available products of these (meth)acrylates include LIGHT ESTER EG, LIGHT ESTER 2EG, LIGHT ESTER 3EG, LIGHT ESTER 4EG, LIGHT ESTER 9EG, LIGHT ESTER 14EG, LIGHT ESTER 1,4BG, LIGHT ESTER NP, LIGHT ESTER 1.6HX, LIGHT ESTER 1,9ND, LIGHT ESTER 1.10DC, LIGHT ESTER DCP-M, LIGHT ESTER BP-2EMK, LIGHT ESTER BP-4EM. LIGHT ESTER BP-6EM, LIGHT ESTER TMP, LIGHT ACRYLATE 3EG-A, LIGHT ACRYLATE 4EG-A, LIGHT ACRYLATE 9EG-A, LIGHT ACRYLATE 14EG-A, LIGHT ACRYLATE PTMGA-250, LIGHT ACRYLATE NP-A, LIGHT ACRYLATE MPD-A, LIGHT ACRYLATE 1,6HX-A, LIGHT ACRYLATE BEPG-A, LIGHT ACRYLATE 1,9ND-A, LIGHT ACRYLATE MOD-A, LIGHT ACRYLATE DCP-A, LIGHT ACRYLATE BP-4EA, LIGHT ACRYLATE BP-4PA, LIGHT ACRYLATE BA-134, LIGHT ACRYLATE BP-10EA, LIGHT ACRYLATE HPP-A, LIGHT ACRYLATE TMP-A, LIGHT ACRYLATE TMP-3EO-A, LIGHT ACRYLATE TMP-6EO-3A, LIGHT ACRYLATE PE-4A, LIGHT ACRYLATE DPE-6A, AT-600, and AH-600 (all manufactured by Kyoeisha Chemical Co., Ltd.); ARONIX M-215, ARONIX M-220, ARONIX M-225, ARONIX M-270, ARONIX M-240, ARONIX M-310, ARONIX M-321, ARONIX M-350, ARONIX M-360, ARONIX M-370, ARONIX M-315, ARONIX M-325, and ARONIX M-327 (all manufactured by Toagosei Co., Ltd.).

In the case of using a polymerizable monomer or a polymerizable oligomer in the formation of the transparent conductive layer, it is preferable that the entirety of the organic binder resin used in the transparent conductive layer be cured using a thermal polymerization initiator or a photopolymerization initiator, and produced into a thin film. There are no particular limitations on the thermal curing method and the photocuring method, and conventional curing methods for the respective cases can be applied.

The thermal polymerization initiator used in the present invention may be any compound that can be degraded by heat, thereby generate radicals, and thereby initiate the polymerization of a polymerizable compound. Useful radical initiators are initiators that are already known, and examples thereof include organic peroxides and azonitriles; however, the radical initiators are not intended to be limited to these. Examples of the organic peroxides include alkyl peroxides, aryl peroxides, acyl peroxides, aroyl peroxides, ketone peroxides, peroxycarbonates, and peroxycarboxylates.

Examples of the alkyl peroxides include diisopropyl peroxide, ditertiary butyl peroxide, ditertiary amyl peroxide, tertiary butyl peroxy-2-ethylhexanoate, tertiary amyl peroxy-2-ethylhexanoate, and tertiary butyl hydroperoxide. Examples of the aryl peroxides include dicumyl peroxide, and cumyl hydroperoxide. Examples of the acyl peroxides include dilauroyl peroxide. Examples of the aroyl peroxides include dibenzoyl peroxide. Examples of the ketone peroxides include methyl ethyl ketone peroxide and cyclohexanone peroxide.

Examples of the azonitriles include azobisisobutyronitrile, and azobisisopropylnitrile.

Commercially available products of the thermal polymerization initiator include, in particular, PEROYL IB, PERCUMYL ND, PEROYL NPP, PEROYL NPP, PEROYL SBP, PEROCTA ND, PEROYL TCP, PEROYL OPP, PERHEXYL ND, PERBUTYL ND, PERBUTYL NHP, PERHEXYL PV, PERBUTYL PV, PEROYL 355, PEROYL L, PEROCTA O, PEROYL SA, PERHEXA 25O, PERHEXYL O, NYPER PMB, PERBUTYL O, NYPER BMT, NYPER BW, PERHEXA MC, and PERHEXA TMH (all manufactured by NOF Corp.); azo compounds, in particular, 2,2'-azobis(4-methoxy-2,4-dimethylvaleronitrile), 2,2'-azobis(2,4-dimethylvaleronitrile) 2,2'-azobis(2-methylbutyronitrile), 2,2'-azobis(N-(2-propenyl)-2-methylpropionamide) and/or dimethyl 2,2'-azobis(2-methylpropionate), and dimethyl 2,2'-azoisobutyrate.

The photopolymerization initiator may be any compound that can be degraded upon light irradiation, thereby generate radicals, and thereby initiate the polymerization of a polymerizable compound. Examples thereof include acetophenone, acetophenone benzyl ketal, 1-hydroxycyclohexyl phenyl ketone, 2,2-dimethoxy-2-phenylacetophenone, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholinopropan-1-one, 2,4,6-trimethylbenzoyldiphenylphosphine oxide, and bis-(2,6-dimethoxybenzoyl)-2,4,4-trimethylpentylphosphine oxide, but the photopolymerization initiator is not intended to be limited to these.

The commercially available products of the photopolymerization initiator include IRGACURE 651, IRGACURE 184, IRGACURE 500, IRGACURE 2959, IRGACURE 127, IRGACURE 754, IRGACURE 907, IRGACURE 369, IRGACURE 379, IRGACURE 379EG, IRGACURE 1300, IRGACURE 819, IRGACURE 819DW, IRGACURE 1800, IRGACURE 1870, IRGACURE 784, IRGACURE OXE01, IRGACURE OXE02, IRGACURE 250, IRGACURE PAG103, IRGACURE PAG108, IRGACURE PAG121, IRGACURE PAG203, DAROCURE 1173, DAROCURE MBF, DAROCURE TPO, DAROCURE 4265, DAROCURE EDB, and DAROCURE EHA (all manufactured by Ciba Japan K.K.); C0014, B1225, D1640, D2375, D2963, M1245, B0103, C1105, C0292, E0063, P0211, I0678, P1410, P1377, M1209, F0362, B0139, B1275, B0481, D1621, B1267, B1164, C0136, C1485, I0591, F0021, A0061, B0050, B0221, B0079, B0222, B1019, B1015, B0942, B0869, B0083, B2380, B2381, D1801, D3358, D2248, D2238, D2253, B1231, M0792, A1028, B0486, T0157, T2041, T2042, T1188, and T1608 (all manufactured by Tokyo Chemical Industry Co., Ltd.).

The surface resistivity of the transparent conductive layer is preferably 1000Ω/□ or greater, and more preferably 2000Ω/□ or greater.

In order to adjust the surface resistivity to 1000Ω/□ or greater, the adjustment can be achieved by adjusting the dopant as will be described below, using the above-described polymers as conductive polymers.

The measurement of the surface resistivity is carried out by a four-point probe method using a low resistivity meter (trade name: LORESTA EP, manufactured by Dia Instruments Co., Ltd.). Meanwhile, if the organic binder resin of the transparent conductive layer is a curable resin, the measurement of the surface resistivity is carried out after curing.

(Transparent Resin Substrate)

As the transparent resin substrate according to the present invention, for example, a polymer film or the like can be used.

Examples of the polymer film include resins films such as films of polyesters such as polyethylene terephthalate; films of polyolefins such as polypropylene; polyvinyl chloride films, acrylic resin films, polyether sulfone films, polyallylate films, and polycarbonate films. However, a polyethylene terephthalate film is preferred because it has excellent transparency and is excellent in moldability, adhesiveness, processability, and the like.

(Transparent Conductive Resin Substrate)

The thickness of the transparent conductive layer that is coated on the transparent resin substrate is preferably in the range of 10 nm to 5,000 nm, and there are no particular limitations on the thickness of the transparent resin substrate. For example, when the transparent resin substrate is a polymer film, the thickness is preferably in the range of 10 μm to 200 μm.

The transparent conductive layer according to the present invention can be produced by applying a mixture of conductive particles and an organic binder resin on a transparent resin substrate by using a bar coater method, a Meyer bar coater method, an applicator method, a doctor blade method, a roll coater method, a die coater method, a comma coater method, a gravure coating method, a microgravure coating method, a roll brush method, a spray coating method, an air knife coating method, an impregnation method, and a curtain coating method.

The conductive particles according to the present invention are preferably an ITO powder. A conductive ITO thin film containing an ITO powder as the conductive particles can also be produced by applying a mixture of an ITO powder and an organic binder resin and drying it, and then subjecting the coating film thus obtained to a calender treatment or a press treatment.

When the mixture is applied, the mixture may also be diluted with an appropriate solvent if necessary. In the case of using a solvent, drying is necessary after the dilution is applied on the transparent resin substrate.

The solvent used in the formation of the transparent conductive layer according to the present invention may be any solvent which is capable of dissolving or dispersing a material that forms the transparent conductive layer, and of being removed by drying or the like after the formation of the transparent conductive layer. Examples thereof that can be used include water, isopropyl alcohol, ethanol, methanol, 1-methoxy-2-propanol, 2-methoxyethanol, cyclohexanone, methyl isobutyl ketone, anisole, methyl ethyl ketone, acetone tetrahydrofuran, toluene, heptane, cyclohexane, ethyl acetate, propylene glycol monomethyl ether acetate, diethyl diglycol, dimethyl diglycol, isoamyl acetate, and hexyl acetate. Solvent mixtures thereof may also be used.

<Light Control Layer>

The light control layer according to the present invention is formed from a light control material containing a resin matrix and a light control suspension dispersed in the resin matrix. Meanwhile, the resin matrix is formed from a polymeric medium, and the light control suspension is a liquid in which light control particles are dispersed in a dispersion medium in a flowable state. As the polymeric medium and the dispersion medium (the dispersion medium in the light control suspension), use is made of a polymeric medium and a dispersion medium that make it possible that the polymeric medium and a cured product therefrom can undergo phase-separation from the dispersion medium at least when these material have been formed into a film. It is preferable to use a combination of a polymeric medium and a dispersion medium that are non-compatible or only partially compatible with each other.

(Polymeric Medium)

The polymeric medium used in the present invention may be a medium which includes (A) a resin having a substituent containing an ethylenically unsaturated bond, and (B) a photopolymerization initiator, and is cured when irradiated with an energy beam such as ultraviolet ray, visible ray, or electron beam.

As the (A) resin having an ethylenically unsaturated bond, a silicone resin (also called "polysiloxane resin"), an acrylic resin, a polyester resin and the like are used with preference, from the viewpoints of ease of synthesis, light control performance, durability and the like. It is preferable that these resins have, as substituents, alkyl groups such as a methyl group, an ethyl group, a propyl group, an isopropyl group, a butyl group, an isobutyl group, a tert-butyl group, an amyl group, an isoamyl group, a hexyl group and a cyclohexyl group; and aryl groups such as a phenyl group and a naphthyl group, from the viewpoints of light control performance, durability and the like.

Specific examples of the silicone resin include those resins described in JP-B No. 53-36515, JP-B No. 57-52371, JP-B No. 58-53656, JP-B No. 61-17863, and the like.

The silicone resins are synthesized by, for example, subjecting silanol-both-terminated siloxane polymers such as a silanol-both-terminated polydimethylsiloxane, a silanol-both-terminated polydiphenylsiloxane-dimethylsiloxane copolymer, and a silanol-both-terminated polymethylphenylsiloxane; trialkylalkoxysilanes such as trimethylethoxysilane; silane compounds containing an ethylenically unsaturated bond such as (3-acryloxypropyl)methyldimethyldimethoxysilane; and the like to a dehydrogenation condensation reaction and a dealcoholization reaction in the presence of an organotin-based catalyst such as tin 2-ethylhexanoate. As the type of the silicone resin, a solvent-free type is used with preference. That is, when a solvent is used in the synthesis of a silicone resin, it is preferable to remove the solvent after the synthesis reaction.

In regard to the feed blending of the various raw materials for condensation at the time of production of the silicone resins, the amount of the silane compound containing the ethylenically unsaturated bond such as (3-acryloxypropyl)methyldimethoxysilane is preferably set to 2.0% to 8.0% by mass, and more preferably to 2.3% to 6.9% by mass, relative to the total amount of the raw materials for condensation of the structural units of the polysiloxane resin (total amount of the raw material siloxane and silane compounds). If the amount of the silane compound containing the ethylenically unsaturated bond is less than 2.0% by mass, the ethylenically unsaturated bond concentration of the resin that is finally obtained tends to be excessively lower than the desired concentration. If the amount is greater than 8.0% by mass, the ethylenically unsaturated bond concentration of the resulting resin tends to be excessively higher than the desired concentration.

The acrylic resin can be obtainable by, for example, copolymerizing a main chain-forming monomer such as a (meth)acrylic acid alkyl ester, a (meth)acrylic acid aryl ester, benzyl (meth)acrylate or styrene, and a monomer containing a functional group for introducing an ethylenically unsaturated bond, such as (meth)acrylic acid, hydroxyethyl (meth)acrylate, isocyanatoethyl (meth)acrylate or glycidyl (meth)acrylate, to synthesize a prepolymer, and then performing an addition reaction of a monomer such as glycidyl (meth)acrylate, isocyanatoethyl (meth)acrylate, hydroxyethyl (meth)acrylate or (meth)acrylate, to the prepolymer so that the monomer can react with the functional groups of the prepolymer.

There are no particular limitations on the polyester resin, and examples thereof include those polymers that can be easily produced by known methods.

The weight average molecular weight of this (A) resin having an ethylenically unsaturated bond, as measured by gel permeation chromatography and calculated relative to polystyrene standards, is preferably in the range of 35,000 to 60,000, more preferably in the range of 37,000 to 58,000, and even more preferably in the range of 40,000 to 55,000.

The amount of the structural unit containing an ethylenically unsaturated bond of the resin having an ethylenically unsaturated bond, is preferably 1.3% to 5.0% by mass, and more preferably 1.5% to 4.5% by mass, relative to the total amount of structural units.

The ethylenically unsaturated bond concentration of the (A) resin having an ethylenically unsaturated bond can be determined from the integrated intensity ratio of hydrogen obtained by NMR. Furthermore, when the conversion ratio of the feed raw materials to the resin is known, the ethylenically unsaturated bond concentration can also be determined by calculation.

The (B) photopolymerization initiator used in the polymeric medium may be any agent that can be degraded upon light irradiation, thereby generate radicals, and thereby initiate the polymerization of a polymerizable compound. Examples thereof include, but are not limited to, acetophenone, acetophenone benzyl ketal, 1-hydroxycyclohexyl phenyl ketone, 2,2-dimethoxy-2-phenylacetophenone, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylophenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholinopropan-1-one, 2,4,6-trimethylbenzoyldiphenylphosphine oxide, and bis-(2,6-dimethoxybenzoyl)-2,4,4-trimethylpentylphosphine oxide.

Commercially available products of the photopolymerization initiator include IRGACURE 651, IRGACURE 184, IRGACURE 500, IRGACURE 2959, IRGACURE 127, IRGACURE 754, IRGACURE 907, IRGACURE 369, IRGACURE 379, IRGACURE 379EG, IRGACURE 1300, IRGACURE 819, IRGACURE 819DW, IRGACURE 1800, IRGACURE 1870, IRGACURE 784, IRGACURE OXE01, IRGACURE OXE02, IRGACURE 250, IRGACURE PAG103, IRGACURE PAG108, IRGACURE PAG121, IRGACURE PAG203, DAROCUR 1173, DAROCUR MBF, DAROCUR TPO, DAROCUR 4265, DAROCUR EDB, and DAROCUR EHA (all manufactured by Ciba Japan K.K.); C0014, B1225, D1640, D2375, D2963, M1245, B0103, C1105, C0292, E0063, P0211, I0678, P1410, P1377, M1209, F0362, B0139, B1275, B0481, D1621, B1267, B1164, C0136, C1485, I0591, F0021, A0061, B0050, B0221, B0079, B0222, B1019, B1015, B0942, B0869, B0083, B2380, B2381, D1801, D3358, D2248, D2238, D2253, B1231, M0792, A1028, B0486, T0157, T2041, T2042, T1188, and T1608 (all manufactured by Tokyo Chemical Industry Co., Ltd.).

The amount of use of the (B) photopolymerization initiator is preferably in the range of 0.1 to parts by mass, and more preferably 0.2 to 10 parts by mass, relative to 100 parts by mass of the (A) resin.

Furthermore, in addition to the (A) resin having a substituent containing an ethylenically unsaturated bond, an organic solvent-soluble resin or a thermoplastic resin, for example, a polyacrylic acid, a polymethacrylic acid or the like, each of which has a weight average molecular weight of 1,000 to 100,000 as measured by gel permeation chromatography and calculated relative to polystyrene standards, can also be used in combination as a constituent material of the polymeric medium.

Further, additives such as a coloration preventing agent such as dibutyltin dilaurate may also be added to the polymeric medium, as necessary. In addition, the polymeric medium may also include a solvent, and examples of the solvent that can be used include tetrahydrofuran, toluene, heptane, cyclohexane, ethyl acetate, ethanol, methanol, isoamyl acetate, and hexyl acetate.

(Light Control Suspension)

As the dispersion medium in the light control suspension, use is made of a medium which may be phase separated from the polymeric medium and the resin matrix, which is a cured product of the polymeric medium. Preferably, use is made of a liquid copolymer which plays the role of dispersing light control particles in a flowable state, selectively adheres and coats the light control particles, operates at the time of phase separation from the polymeric medium so that the light control particles move to the liquid droplet phase that has been phase separated, has no electrical conductivity, has no affinity with the polymeric medium, and has a refractive index that is close to that of the resin matrix which is formed from the polymeric medium when a light control film is formed.

As the liquid copolymer, for example, a (meth)acrylic acid ester oligomer having a fluoro group and/or a hydroxyl group is preferred, and a (meth)acrylic acid ester oligomer having a fluoro group and a hydroxyl group is more preferred. When such a copolymer is used, a monomer unit having any one of a fluoro group and a hydroxyl group has affinity with the light control particles, and the other monomer unit works so as to stably maintain the light control suspension in the form of liquid droplets in the polymeric medium. Then, the light control particles may be easily dispersed in the light control suspension, and the light control particles may be easily led into the liquid droplets to be phase separated, at the time of phase separation.

Examples of such a (meth)acrylic acid ester oligomer having a fluoro group and/or a hydroxyl group include a 2,2,2-trifluoroethyl methacrylate/butyl acrylate/2-hydroxyethyl acrylate copolymer, a 3,5,5-trimethylhexyl acrylate/2-hydroxypropyl acrylate/fumaric acid copolymer, a butyl acrylate/2-hydroxyethyl acrylate copolymer, a 2,2,3,3-tetrafluoropropyl acrylate/butyl acrylate/2-hydroxyethyl acylate copolymer, a 1H,1H,5H-octafluoropentyl acrylate/butyl acrylate/2-hydroxyethyl acrylate copolymer, a 1H,1H,2H, 2H-heptadecafluorodecyl acrylate/butyl acrylate/2-hydroxyethyl acrylate copolymer, a 2,2,2-trifluoroethyl methacrylate/butyl acrylate/2-hydroxyethyl acrylate copolymer, a 2,2,3,3-tetrafluoropropyl methacrylate/butyl acrylate, 2-hydroxyethyl acrylate copolymer, a 1H,1H,5H-octafluoropentyl methacrylate/butyl acrylate/2-hydroxyethyl acrylate copolymer, a 1H,1H,2H,2H-heptadecafluorodecyl methacrylate/butyl acrylate/2-hydroxyethyl acrylate copolymer, a butyl methacrylate/2-hydroxyethyl methacrylate copolymer, a hexyl methacrylate/2-hydroxyethyl methacrylate copolymer, an octyl methacrylate/2-hydroxyethyl methacrylate copolymer, a decyl methacrylate/2-hydroxyethyl methacrylate copolymer, an undecyl methacrylate/2-hydroxyethyl methacrylate copolymer, a dodecyl methacrylate/2-hydroxyethyl methacrylate copolymer, a tridecyl methacrylate/2-hydroxyethyl methacrylate copolymer, a tetradecyl methacrylate/2-hydroxyethyl methacrylate copolymer, a hexadecyl methacrylate/2-hydroxyethyl methacrylate copolymer, and an octadecyl methacrylate/2-hydroxyethyl methacrylate copolymer.

Such a (meth)acrylic acid ester oligomer preferably has a weight average molecular weight within the range of 1,000 to 20,000, and more preferably within the range of 2,000 to 10,000, as measured by gel permeation chromatography and calculated relative to polystyrene standards.

The amount of use of a fluoro group-containing monomer that is used as a raw material of these (meth)acrylic acid ester oligomers is preferably 6% to 12% by mole of the total amount of the raw material monomers, and a more effective amount of use is 7% to 8% by mole. If the amount of use of the fluoro group-containing monomer is greater than 12% by mole, the refractive index tends to increase, and the light transmittance tends to decrease.

Furthermore, the amount of use of a hydroxyl group-containing monomer that is used as a raw material of these (meth)acrylic acid ester oligomers is preferably 0.5% to 22.0% by mole, and a more effective amount of use is 1% to 8% by mole. If the amount of use of the hydroxyl group-containing monomer is greater than 22.0% by mole, the refractive index tends to increase, and the light transmission properties tend to decrease.

The light control suspension used in the present invention is a suspension in which light control particles are dispersed in a dispersion medium in a flowable manner. As the light control particles, for example, use may be made with preference of needle-shaped crystallites of a polyiodide produced by allowing one substance selected from the group consisting of pyrazine-2,3-dicarboxylic acid dihydrate, pyrazine-2,5-dicarboxylic acid dihydrate, and pyridine-2,5-dicarboxylic acid monohydrate, which are all precursors of light control particles, to react with iodine and an iodide, in the presence of a polymer dispersant which has no affinity with the polymeric medium or the resin component in the polymeric medium, that is, the (A) resin having a substituent having an ethylenically unsaturated bond, and can increase the dispersibility of the light control particles. Examples of the polymer dispersant that can be used include nitrocellulose. Examples of the iodide include calcium iodide. Examples of the polyiodide that is obtainable as such include polymers represented by the following general formulas:

$$CaI_2(C_6H_4N_2O_4) \cdot XH_2O (X: 1 \text{ to } 2) \text{ and}$$

$$CaI_a(C_6H_4N_2O_4)_b \cdot cH_2O (a:3 \text{ to } 7, b:1 \text{ to } 2, c:1 \text{ to } 3).$$

These polyiodides are preferably in the form of needle-shaped crystals.

Furthermore, as the light control particles used in the light control suspension for light control film, those light control particles disclosed in U.S. Pat. No. 2,041,138 (E. H. Land), U.S. Pat. No. 2,306,108 (Land et al.), U.S. Pat. No. 2,375,963 (Thomas), U.S. Pat. No. 4,270,841 (R. L. Saxe), and GB Patent No. 433,455 can also be used. The polyiodide crystals that are known by these patents are each produced by selecting one from pyrazinecarboxylic acids and pyridinecarboxylic acids, and causing the selected acid to react with iodine, chlorine or bromine so as to obtain a polyhalide such as polyiodide, polychloride or polybromide. These polyhalides are complex compounds obtainable by allowing halogen atoms to react with inorganic or organic substances, and the details of the production method thereof are disclosed in, for example, U.S. Pat. No. 4,422,963 issued to Saxe.

As disclosed by Saxe, in the process for synthesizing light control particles, it is preferable to use a polymer substance such as nitrocellulose as a polymer dispersant as described above, in order to form light control particles having a uniform size and to enhance the dispersibility of the light control particles in a particular dispersion medium. However, if nitrocellulose is used, crystals coated with nitrocellulose are obtained, and when these crystals are used as light control particles, the light control particles do not suspend inside the liquid droplets that are separated at the time of phase separation and may remain in the resin matrix. In order to prevent this, it is preferable to use a silicone resin as the (A) resin having a substituent containing an ethylenically unsaturated bond of the polymeric medium. When a silicone resin is used, the light control particles are easily dispersed and suspended in the fine liquid droplets formed by phase separation at the time of production of the light control film, and as a result, a superior modulation ability can be obtained.

According to the present invention, the particle size of the light control particles is preferably the size shown below, from the viewpoint of the relation between the response time to the applied voltage when a light control film is produced, and the aggregation and precipitation of the light control particles in the light control suspension.

The major axis of the light control particles is preferably in the range of 225 nm to 625 nm, more preferably in the range of 250 nm to 550 nm, and even more preferably in the range of 300 nm to 500 nm.

The ratio of the major axis to the minor axis of the light control particles, that is, the aspect ratio, is preferably 3 to 8, more preferably 3.3 to 7, and even more preferably 3.6 to 6.

The major axis and the minor axis of the light control particles according to the present invention can be determined by picking an image of the light control particles with an electron microscope such as a scanning microscope or a transmission electron microscope, extracting any fifty light control particles from the image picked up, and calculating the major axis and the minor axis of the various light control particles as an average value. Here, the major axis is defined as the length of the longest part in a light control particle projected in a two-dimensional field of view based on the image picked up. Furthermore, the minor axis is defined as the length of the longest that is perpendicular to the major axis.

Furthermore, as the method of evaluating the particle size of the light control particles according to the present invention, a particle size distribution meter which uses the principle of photon correlation spectrometry or dynamic light scattering can be used. In this method, the size or morphology of a particle is not directly measured, but a particle is assumed to be spherical, and the corresponding diameter is evaluated, so that a value different from the results of SEM observation is obtained. Particularly, when the corresponding diameter outputted as Z average using ZETASIZER NANO series manufactured by Sysmex Corp. is designated as the particle size, the particle size of the light control particle (hereinafter, referred to as "particle size that can be determined by particle size distribution analysis") is preferably in the range of 135 nm to 220 nm, more preferably in the range of 140 nm to 210 nm, and even more preferably in the range of 145 nm to 205 nm n.

This Z average value is known to show good relations with the measured values of a different particle size distribution meter which is based on, for example, photon correlation spectrometry or dynamic light scattering, specifically, the major axis and the minor axis of the light control particles measured with an electron microscope such as the transmission electron microscope described above. Thus, the Z average value is appropriate as an index for evaluating the particle size.

It is preferable that the light control suspension used in the present invention contain light control particles in an amount of 1% to 15% by mass, and more preferably 2% to 10% by mass, relative to the total mass of the light control suspension. Furthermore, it is preferable that the light control suspension contain a dispersion medium in an amount of 30% to 99% by mass, and more preferably 50% to 96% by mass, relative to the total mass of the light control suspension.

Furthermore, it is preferable that the light control material contain the light control suspension in an amount of 1 to 100 parts by mass, more preferably 4 to 70 parts by mass, even more preferably 6 to 60 parts by mass, and particularly preferably 8 to 50 parts by mass, relative to 100 parts by mass of the polymeric medium.

It is preferable that the refractive index of the polymeric medium and the refractive index of the dispersion medium according to the present invention be close to each other. Specifically, the difference in the refractive index between the polymeric medium and the dispersion medium according to the present invention is preferably 0.005 or less, and more preferably 0.003 or less.

(Light Control Material)

The light control material contains the light control suspension in an amount of usually 1 to 100 parts by mass, preferably 6 to 70 parts by mass, and more preferably 6 to 60 parts by mass, relative to 100 parts by mass of the polymeric medium.

<Light Control Film>

The light control film of the present invention can be formed by using a light control material. The light control material is composed of a resin matrix formed from a polymeric medium, and a light control suspension dispersed in the resin matrix, and forms a light control layer. The light control layer is interposed between two of transparent conductive resin substrates each having a transparent conductive layer containing an organic binder resin and a conductive polymer, to be in contact with the transparent conductive layer sides.

In order to obtain a light control film, first, a liquid light control suspension is homogeneously mixed with a polymeric medium, and thus a light control material formed from a liquid mixture in which the light control suspension is dispersed in the form of liquid droplets in the polymeric medium, is obtained.

Specifically, the process is as follows. A liquid in which light control particles are dispersed in a solvent, and the dispersion medium of the light control suspension are mixed, and the solvent is distilled off with a rotary evaporator or the like to prepare a light control suspension. As the solvent for dispersing the light control particles, isoamyl acetate or the like is used.

Subsequently, the light control suspension and the polymeric medium are mixed, and thus a liquid mixture (light control material) in which the light control suspension is dispersed in the form of liquid droplets in the polymeric medium, is obtained.

This light control material is applied on the transparent conductive layer of the transparent conductive resin substrate to a certain thickness, and if necessary, the solvent contained in the light control material is removed by drying. Subsequently, the light control material is irradiated with ultraviolet ray using a high pressure mercury lamp or the like, and thus the polymeric medium is cured. As a result, a light control layer in which the light control suspension is dispersed in the form of liquid droplets in a resin matrix formed from the cured polymeric medium, is completed. The light transmittance of the light control layer can be controlled by varying the mixing ratio between the polymeric medium and the light control suspension to various values.

The other transparent conductive resin substrate is adhered onto the light control layer formed as such, so that the light control layer is in contact with the transparent conductive layer in which conductive particles are dispersed in an organic binder resin, and thereby a light control film is obtained. Alternatively, it is still acceptable to obtain the light control film by applying this light control material on the transparent conductive layer of the transparent conductive resin substrate to a certain thickness; if necessary, removing the solvent in the light control material by drying; subsequently, laminating the resulting coated substrate with the other transparent conductive resin substrate having a transparent conductive layer; and then irradiating the laminate with ultraviolet ray to cure the polymeric medium.

It is also acceptable to obtain the light control film by forming a light control layer on both sides of two transparent conductive resin substrates, and then laminating those substrates such that the light control layers are adhered to each other. The thickness of the light control layer is preferably in the range of 5 μm to 1,000 μm, and more preferably in the range of 20 μm to 100 μm.

For the application of the light control material that forms the light control layer, for example, a known coating means such as a bar coater, an applicator, a doctor blade, a roll coater, a die coater, or a comma coater can be used. When the light control material is applied, if necessary, the light control material may be diluted with an appropriate solvent. If a solvent has been used, it is necessary to dry the solvent after the light control material is applied on the transparent conductive resin substrate.

As the solvent to be used in the application of the light control material, tetrahydrofuran, toluene, heptane, cyclohexane, ethyl acetate, ethanol, methanol, isoamyl acetate, hexyl acetate and the like can be used.

In order to form a light control layer in which a liquid light control suspension is dispersed in the form of fine liquid droplets in a solid resin matrix, a method comprising the steps of mixing the light control material with a homogenizer, an ultrasonic homogenizer or the like, and of finely dispersing the light control suspension in the polymeric medium; a phase separation method based on the polymerization of the resin component in the polymeric medium; a phase separation method based on the volatilization of the solvent included in the light control material; a phase separation method based on temperature; or the like can be used.

The size of the liquid droplets (average liquid droplet size) of the light control suspension dispersed in the resin matrix is usually in the range of 0.5 μm to 100 μm, preferably in the range of 0.5 μm to 20 μm, and more preferably in the range of 1 μm to 5 μm. The size of the liquid droplets can be determined by the concentrations of the various components constituting the light control suspension, the viscosities of the light control suspension and the polymeric medium, the compatibility of the dispersion medium in the light control suspension to the polymeric medium, and the like.

The average liquid droplet size can be determined by, for example, picking up an image such as a photograph from one plane direction of the light control film using SEM, measuring the sizes of plural liquid droplets that are arbitrarily selected, and calculating the average value. Furthermore, the average liquid droplet size can also be determined by inputting the image of the field of view of the light control film obtained by an optical microscope, as digital data into a computer, and calculating the size using an image processing integration software.

The radio wave shielding property of this light control film is preferably 5 dB or less, and more preferably 3 dB or less, in the frequency region of 500 MHz or higher. This can be achieved by adjusting the surface resistivity of the transparent conductive layer to 1000Ω/□ or greater.

The method of measuring the radio wave shielding property is carried out in the following manner.

The radio wave shielding property is measured at the Kansai Electronic Industry Development Center using a test specimen having a size of 200 mm×200 mm and a thickness of 340 μm by the KEC method.

According to the method described above, there is provided a light control film for which the light transmittance can be arbitrarily controlled by the formation of an electric field. This light control film maintains a vividly colored state without any scattering of light even in the case where an electric field is not formed, and when an electric field is formed, the light control film is converted to a transparent state. This ability exhibits reversible repetitive characteristics of 200,000 times or more. In order to enhance the light transmittance in the transparent state and to enhance the degree of vividness in the colored state, it is preferable to match the refractive index of the liquid light control suspension and the refractive index of the resin matrix.

For the power supply used to operate the light control film, an alternating current voltage in the range of 10 to 100 volts (effective value) at a frequency in the range of 30 Hz to 500 kHz may be used.

For the light control film of the present invention, the response time to the electric field can be adjusted to within 1 to 50 seconds at the time of decoloration, and to within 1 to 100 seconds at the time of coloration. Furthermore, in regard to the ultraviolet durability, when the light control film is subjected to an ultraviolet ray irradiation test using an ultraviolet ray at 750 W, the light control film exhibits stable variable characteristics even after a lapse of 250 hours, and even when the light control film is left to stand for a long time at −50° C. to 90° C., the light control film can maintain the initial variable characteristics.

In the production of a light control film using liquid crystals according to a prior art technology, when a method involving an emulsion using water is used, the liquid crystals frequently react with moisture and lose the light control characteristics, and therefore, there is a problem in that it is difficult to produce films having the same characteristics. According to the present invention, since liquid crystals are not used, but a liquid light control suspension in which light control particles are dispersed in the light control suspension is used, unlike those light control films utilizing liquid crystals, the light control film of the present invention does not cause scattering of light even when an electric field is not applied, has excellent vividness, and exhibits a colored state without any limitation in the viewing angle. Furthermore, the degree of light variability can be arbitrarily controlled by regulating the content of the light control particles, the form of liquid droplets or the layer thickness, or by regulating the intensity of the electric field. Further, since the light control film of the present invention does not use liquid crystals, problems such as color tone change caused by exposure to ultraviolet ray, a decrease in the variability, and the difference in the response time accompanied by a decrease in voltage occurring between the peripheral area and the center of the transparent conductive substrate, which is characteristics to large-sized products, are also solved.

When an electric field is not applied to the light control film according to the present invention, a vividly colored state is exhibited due to the light absorption by the light control particles and a dichroic effect as a result of the Brownian motion of the light control particles in the light control suspension. However, when an electric field is applied, the light control particles in the liquid droplets or in connected bodies of the liquid droplets are arranged in parallel to the electric field and the film is converted to a transparent state.

Furthermore, since the light control film is in the form of film, the problems of those light control glasses based on the prior art technology in which liquid light control suspension is directly used, that is, the difficulty of injection of the liquid suspension between two transparent conductive resin substrates; the phenomenon of swelling of the lower part due to the difference in hydraulic pressure between the upper part and the lower part of a product; localized changes in color phase due to the change in the gap between the substrates caused by the external environment such as the pressure of wind; and the leakage of the light control material caused by destruction of the sealing material between the transparent conductive substrates, are solved.

Furthermore, in the case of light control windows based on the prior art technology using liquid crystals, the liquid crystals are prone to deteriorate due to ultraviolet ray, and because of the thermal characteristics of nematic liquid crystals, the range of the use temperature is also narrow. Further, in terms of the optical characteristics, those light control windows have a problem in that when an electric field is not applied, the windows exhibit a semi-transparent state in milk white color due to light scattering, and even in the case where an electric field is applied, the windows do not become completely clear, while an opacified state still remains. Therefore, in such light control windows, the display function based on the blocking and transmission of light that is utilized as the operating principle in conventional liquid crystal display elements is impossible. However, when the light control film according to the present invention is used, such problems can be solved.

The light control film of the present invention has excellent radio wave transparency, so that even in a space surrounded with the light control film, television sets, mobile telephones, remote control devices utilizing radio waves, ETC and the like can be made to function adequately.

The light control film of the present invention can be suitably used in applications such as, for example, indoor or outdoor partitioning, windowpanes/skylight windows for buildings, various flat display elements used in electronic industry and imaging equipment, substitutes for various gauge boards and existing liquid crystal display elements, light shutters, various indoor and outdoor advertisement and information display boards, windowpanes for airplane/railway vehicles/ships, windowpanes/rearview mirrors/sunroofs for automobiles, spectacles, sunglasses, and sun visors.

In regard to the method of application, the light control film of the present invention can be directly used, but depending on the use, for example, the light control film of the present invention may be used in the state of being interposed between two substrates, or may be used in the state of being attached to one surface of the substrate. As the substrate, for example, glass plates, or polymer films similar ones for the transparent resin substrates described above can be used.

The structure and operation of the light control film according to the present invention may be further described in more detail by way of the attached drawings, as follows.

FIG. 1 is a structural schematic diagram of a light control film according to an embodiment of the present invention, and a light control film 1 is interposed between two of transparent conductive resin substrates 4, each formed from a transparent resin substrate 5b coated with a transparent conductive layer 5a in which conductive particles are dispersed in an organic binder. By switching a switch 8, connection and disconnection of the two transparent conductive layers 5a is carried out with the power supply 7. The light control layer 1 is formed from a film-like resin matrix 2 produced by curing the (A) resin having a substituent containing an ethylenically unsaturated bond with ultraviolet ray, as a polymeric medium, and a liquid light control suspension that is dispersed in the form of liquid droplets 3 inside the resin matrix 2.

Figure 2:
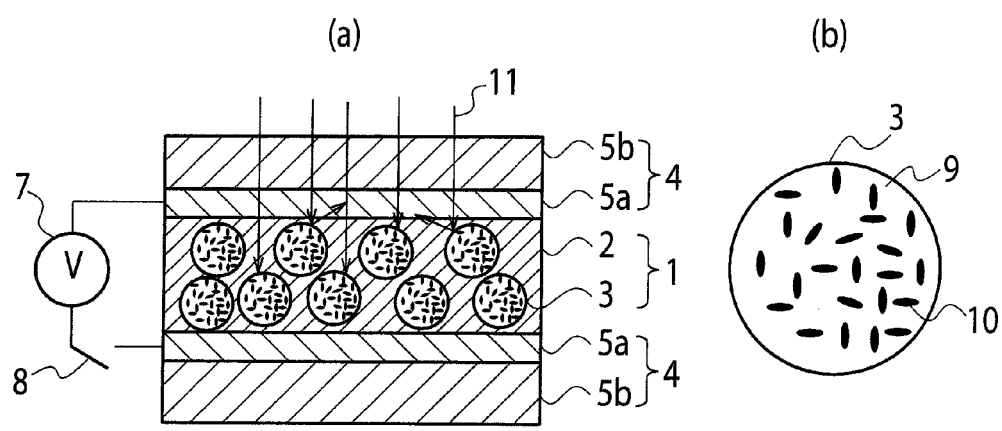
FIGS. 2(a) and 2(b) are each a schematic view for explaining the operation in the case when an electric field is not applied to the light control film in FIG. 1.
Figure 3:
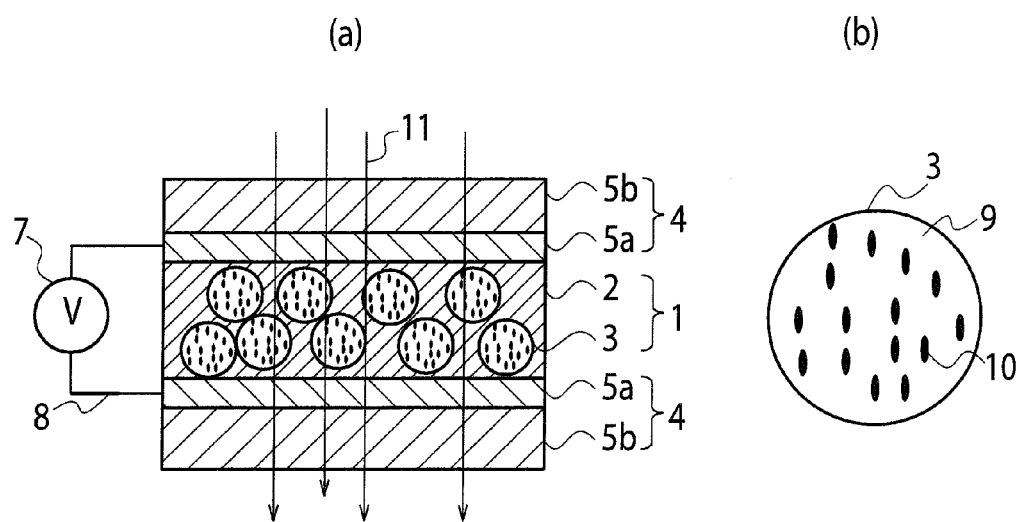
FIGS. 3(a) and 3(b) are each a schematic view for explaining the operation in the case when an electric field is applied to the light control film in FIG. 1.

FIG. 2 is a view for explaining the operation of the light control film shown in FIG. 1, and shows the case where the switch 8 is disconnected, and an electric field is not applied. In this case, due to the Brownian motion of the light control particles 10 that are dispersed in the dispersion medium 9 constituting the liquid droplets 3 of the liquid light control suspension, the incident light ray 11 is absorbed, scattered or reflected by the light control particles 10 and cannot be transmitted. However, as shown in FIG. 3, when the switch 8 is connected, and an electric field is applied, the light control particles are arranged in parallel to the electric field that is formed by the electric field applied thereto, and therefore, the incident light ray 11 passes between the arranged light control particles 10. In this manner, a light transmitting function without any scattering or a decrease in the transparency may be provided.

EXAMPLES

Hereinafter, the present invention will be more specifically described by way of Examples and Comparative Examples of the present invention, but the present invention is not intended to be limited to these Examples.
(Production Example for Light Control Particles)

A 8.5 mass % isopentyl acetate solution of iodine was prepared from iodine (JIS reagent special grade, manufactured by Wako Pure Chemical Industries, Ltd.) and isopentyl acetate (reagent special grade, manufactured by Wako Pure Chemical Industries, Ltd.), and a 20.0 mass % isopentyl acetate solution of cellulose nitrate was prepared from cellulose nitrate ¼ LIG (trade name: manufactured by Bergerak NC) and isopentyl acetate. Calcium iodide hydrate (chemical grade, manufactured by Wako Pure Chemical Industries, Ltd.) was dried by heating to be dehydrated, and the resulting product was dissolved in isopentyl acetate. Thus, a 20.9 mass % calcium iodide solution was prepared. In a 300-ml four-necked flask equipped with a stirrer and a cooling tube, 65.6 g of the iodine solution and 82.93 g of the cellulose nitrate solution were introduced, and the flask was heated at a bath temperature in the range of 35° C. to 40° C. When the temperature of the flask content had reached to the range of 35° C. to 40° C., 7.41 g of dehydrated methanol (reagent special grade, manufactured by Wako Pure Chemical Industries, Ltd.) and 0.525 g of purified water were added to the flask, and the mixture was stirred. 15.6 g of the calcium iodide solution, and then 3.70 g of pyrazine-2,5-dicarboxylic acid (manufactured by Hitachi Chemical Techno Service Co., Ltd.) were added to the flask. The flask content was stirred for 4 hours at a bath temperature in the range of 42° C. to 44° C., and then the flask was left to cool naturally.

For the light control particles thus obtained, the particle size that could be determined by a particle size distribution analysis was 139 nm, the major axis determined by SEM observation was 259 nm, and the aspect ratio was 4.1. Furthermore, the synthesis liquid thus obtained was centrifuged for 5 hours at 9260G, and then the liquid was decanted to remove the supernatant. To the precipitate remaining at the bottom, isopentyl acetate in an amount of five times the mass of this precipitate was added, and the precipitate was dispersed by ultrasonication. The total mass of the liquid was measured. One gram of this dispersion liquid was weighed on a metal plate and was dried for one hour at 120° C. Subsequently, the mass was weighed again, and the non-volatile content ratio in percentage (%) was determined. The total non-volatile content, that is, the precipitation yield, determined from the non-volatile content ratio and the total mass of liquid was 4.15 g.
(Preparation Example for Light Control Suspension)

45.5 g of the light control particles obtained in the previously described (Production Example for light control particles) were added to 50 g of a copolymer of a butyl acrylate (Wako special grade, manufactured by Wako Pure Chemical Industries, Ltd.)/2,2,2-trifluoroethyl methacrylate (industrial grade, manufactured by Kyoeisha Chemical Co., Ltd.)/2-hydroxyethyl acrylate (Wako first grade, manufactured by Wako Pure Chemical Industries, Ltd.) (molar ratio of monomers: 18/1.5/0.5, weight average molecular weight: 2,000, and refractive index: 1.4719), and the mixture was mixed for 30 minutes with a stirrer. Subsequently, isoamyl acetate was removed under reduced pressure using a rotary evaporator, in a vacuum at 133 Pa and 80° C. for 3 hours. Thus, a stable liquid light control suspension having no occurrence of sedimentation and aggregation of the light control particles was prepared.
(Production Example for Energy-Beam-Curable Silicone Resin (Polysiloxane Resin))

In a four-necked flask equipped with a Dean-Starck trap, a cooling tube, a stirrer and a heating apparatus, 15.0 g of (3-acryloxypropyl)methyldimethoxysilane (trade name: KBM-5102, manufactured by Shin-Etsu Chemical Co., Ltd.), 1.9 g of distilled water, 0.04 g of acetic acid (manufactured by Wako Pure Chemical Industries, Ltd.), and 8.9 g of a mixed solvent of ethanol/methanol=9/1 by mass were introduced, and the mixture was heated to 65° C. and was allowed to react for 5 hours. The reaction solution was cooled to 40° C. or lower, and then the pressure was decreased to 100 Pa. The temperature was raised to 70° C., and a solvent removal process was carried out for 2 hours. Thereafter, the residue was cooled to room temperature, and thus 14.0 g of a compound in which a portion of the methoxy groups of the alkoxysilane was converted to silanol groups was obtained. Furthermore, the conversion ratio to silanol was 54.5%.
[Method of Measuring Conversion Ratio to Silanol]

The conversion ratio of an alkoxysilane to silanol can be determined from the intensity (A) of a peak originating from a hydroxyl group (near 3435 cm$^{-1}$) and the intensity (B) of a peak originating from an alkoxy group (near 2835 cm$^{-1}$) obtained in an infrared spectroscopic analysis, by the formula: conversion ratio=A/(A+B)×100. According to the infrared spectroscopic analysis after the conversion from dimethoxysilane to silanol, it was found that Abs=0.250 for (A) and Abs=0.211 for (B), and thus the conversion ratio was calculated to be 54.5%.

In a four-necked flask equipped with a Dean-Starck trap, a cooling tube, a stirrer and a heating apparatus, 48.0 g of a silanol-both-terminated polydimethylsiloxane (trade name: X-21-3114, manufactured by Shin-Etsu Chemical Co., Ltd.), 170.0 g of a silanol-both-terminated polymethylphenylsiloxane (trade name: X-21-3193B, manufactured by Shin-Etsu Chemical Co., Ltd.), 9.0 g of the product obtained by converting the methoxy groups of KBM-5102 to silanol groups, and 0.01 g of tin bis(2-ethylhexanoate) (trade name: KCS-405T, manufactured by Johoku Chemical Co., Ltd.) were introduced, and the mixture was heated to reflux for 5 hours at 100° C. in heptane to carry out a reaction. The temperature was cooled to 50° C., and 109.0 g of trimethylethoxysilane (trade name: KBM-31, manufactured by Shin-Etsu Chemical Co., Ltd.) was added thereto. The resulting mixture was heated to reflux again for 2 hours at 85° C., and thus an end-capping reaction was carried out. Subsequently, the temperature was cooled to 75° C., and 0.01 g (100 parts by mass relative to 100 parts by mass of the dehydration-condensation catalyst, tin bis(2-ethylhexanoate)) of diethyl phosphate (another name: ethyl acid phosphate) (trade name: JP-502, manufactured by Johoku Chemical Co., Ltd.) was added to the reaction liquid. The mixture was stirred for 20 minutes, and then was cooled to 30° C. Subsequently, 210 g of methanol and 90 g of ethanol were added to the mixture, and the resulting mixture was stirred for minutes. The mixture was left to still stand for 12 hours, and then the alcohol layer was removed. The pressure was reduced to 100 Pa, the temperature was raised to 115° C., and solvent removal was carried out for 5 hours. Thus, 148.8 g of a polysiloxane resin (refractive index 1.4745) having a weight average molecular weight of 46,700 and a viscosity of 16,000 was obtained.

At this time, the conversion ratio of the methoxy groups of KBM-5102 relative to the total amount of the condensation raw materials for the structural unit of the polysiloxane resin (total amount of the raw material siloxane and the silane compound) to silanol groups was 2.7% by mass.

Further, according to the integral ratio of hydrogen of NMR, the amount of structural unit of 3-acryloxypropylmethylsiloxane of this resin (ethylenically unsaturated bond concentration) was 1.9% by mass. Meanwhile, the ethylenically unsaturated bond concentration was measured by a method such as described below.

[Method for Measuring Ethylenically Unsaturated Bond Concentration]

The amount of structural unit of 3-acryloxypropylmethylsiloxane was calculated from the integral ratio of hydrogen of NMR (the integral value at near 6 ppm for the hydrogen of the ethylenically unsaturated bond, the integral value at near 7.5 ppm for the hydrogen of the phenyl group, and the integral value at near 0.1 ppm for the hydrogen of the methyl group were used). The solvent used for the measurement was $CDCl_3$. In regard to the resin produced as described above, the ratio of ($^1H$ originating from the methyl group of diphenylsiloxane):($^1H$ originating from the phenyl group of dimethylsiloxane):($^1H$ bonded to the vinyl group of 3-acryloxypropylmethylsiloxane) calculated from the integral ratios of hydrogen of NMR was 10.00:27.89:0.61. Since the numbers of hydrogen atoms contained in each structural unit are 10 for diphenylsiloxane, 6 for dimethylsiloxane, and 3 for hydrogen atoms bonded to the vinyl group of 3-acryloxypropylmethylsiloxane, the amount of structural unit of 3-acryloxypropylmethylsiloxane (ethylenically unsaturated bond concentration) relative to the total amount was calculated to be 1.9% by mass.

Example 1

2.5 g of the light control suspension obtained in the (Preparation Example for light control suspension) was added to 10 g of the energy-beam-curable silicone resin obtained in the (Production Example for energy-beam-curable silicone resin), 0.2 g of bis(2,4,6-trimethylbenzoyl)phenylphosphine oxide (manufactured by Ciba Specialty Chemicals Corp.) as a photopolymerization initiator, and 0.3 g of dibutyltin dilaurate as a coloration preventing agent. The mixture was mechanically mixed for one minute, and thus a light control material was produced.

Meanwhile, for the transparent conductive layer, an ITO powder (manufactured by Dowa Holdings Co., Ltd., average particle size: 30 nm) and a mixture of pentaerythritol triacrylate and pentaerythritol tetraacrylate (trade name: ARONIX M-305, manufactured by Toagosei Co., Ltd.) were mixed at proportions of 75% by mass and 25% by mass, respectively, and this mixture was dispersed in a solvent mixture of methyl ethyl ketone:cyclohexanone=1:1. The dispersion was applied on a PET film (COSMOSHINE A4100, manufactured by Toyobo Co., Ltd., thickness 125 μm) as a transparent resin substrate with a bar coater; and the dispersion was dried under the conditions of 50° C./30 s, 60° C./30 s, and 70° C./1 min. Subsequently, the dispersion was photocured by UV irradiation at 1000 mJ/cm² (metal halide lamp) to form a transparent conductive layer, and thus a transparent conductive resin substrate was obtained. At this time, a photopolymerization initiator (1-hydroxycyclohexyl phenyl ketone) was added in an amount of 3% by mass based on ARONIX M-305. The thickness of the transparent conductive layer after curing was 1.8 μm.

The surface resistivity of the transparent conductive layer was 2400Ω/□.

The light transmittance of the transparent conductive resin substrate is 84%.

On the transparent conductive layer of the transparent conductive resin substrate having the transparent conductive layer formed, the light control material obtained as described above was applied over the entire surface. Subsequently, a transparent conductive resin substrate having a transparent conductive layer formed thereon in the same manner as described above was laminated and adhered thereon such that the transparent conductive layer faced the coating layer of the light control material. Ultraviolet ray at 3000 mJ/cm² was irradiated using a metal halide lamp through the PET film side of the laminated transparent conductive resin substrate. Thus, a light control film having a thickness of 340 μm and having a film-like light control layer having a thickness of 90 μm, in which a light control suspension was dispersed and was formed as spherical liquid droplets in an ultraviolet-cured resin matrix, and which is interposed between transparent conductive resin substrates, was produced.

Figure 4:
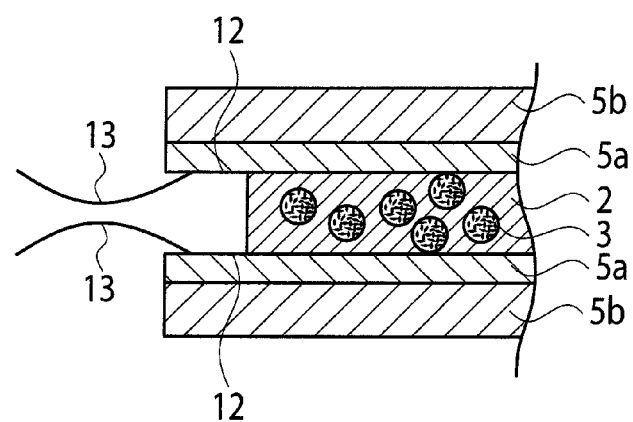
FIG. 4 is a schematic view for explaining the state of an edge of the light control film. Illustration of light control particles 10 in liquid droplets 3 is omitted.

Next, the light control layer was removed from an edge of this light control film, and thus the transparent conductive layer at the edge was exposed so as to allow the passage of electricity for voltage application (see FIG. 4).

The size of the liquid droplets (average liquid droplet size) of the light control suspension in the light control film was 3 μman on the average. The light transmittance of the light control film was 1.0% when an alternating current voltage was not applied (no application). Furthermore, the light transmittance of the light control film when an alternating current voltage of 100 V (effective value) at 50 Hz was applied was 48%, and the ratio of light transmittances at the time of application of electric field and at the time of non-application of electric field was as large as 48, which was satisfactory.

The edge of the light control film (the area where the light control layer was removed and the transparent conductive layer was exposed) was observed by visual inspection, and the curvature of the transparent conductive resin substrate directed toward the center in the thickness direction of the light control film was very small (FIG. 4).

Meanwhile, evaluations of the light transmittance of the light control film, the radio wave shielding property (transparency) at a frequency in the range of 100 kHz to 18 GHz, the surface resistivity, the thickness of the conductive layer, the adhesive strength of the light control layer and the conductive layer, and the peeling mode were carried out as follows.

[Method for Measuring Light Transmittance of Light Control Film]

The Y value (%) measured using a light source A and at a viewing angle of 2 degrees using a spectroscopic colorimeter SZ-Σ90 (manufactured by Nippon Denshoku Industries Co., Ltd.), was designated as the light transmittance. Meanwhile, the light transmittances at the time of application of electric field and at the time of non-application of electric field were measured.

[Method for Measuring Radio Wave Transparency: 100 kHz to 1 GHz]

The radio wave transparency was measured at the Kansai Electronic Industry Development Center using a test specimen having a size of 200 mm×200 mm and a thickness of 340 μm the KEC method.

[Method for Measuring Radio Wave Transparency: 1 GHz to 18 GHz]

The radio wave transparency was measured at Keycom Corp. using a test specimen having a size of 350 mm×350 mm and a thickness of 340 μm and using Redorm for radar, by a cover transmission attenuation measurement system.

[Method for Measuring Surface Resistivity]

The surface resistivity was measured with a four-point probe using a low resistivity meter, LORESTA EP (manufactured by Dia instruments Co., Ltd.).

[Method for Measuring Adhesive Strength Between Light Control Layer and Transparent Conductive Layer]

The measurement of the adhesive strength was carried out using a small-sized tabletop testing machine (precision universal testing machine), EZ-S (manufactured by Shimadzu Corp.), by peeling off the transparent conductive resin substrate from the light control layer of the light control film by pulling at 90°-peel under a load of 50 N at a tensile speed of 50 mm/min. Thus, the adhesive strength was measured.

[Method for Measuring Thickness of Transparent Conductive Layer]

The thickness of the transparent conductive layer was measured using an instantaneous spectrophotometer F-20 (manufactured by Filmetrics Japan, Inc.).

[Method for Evaluating Peeling Mode]

For the light control film obtained after the measurement of adhesive strength, from which the transparent conductive resin substrate was peeled off, the manner of peeling the transparent conductive resin substrate from the light control film was evaluated according to the following evaluation criteria. When the light control layer remained on both of the two sheets of transparent conductive resin substrates, and destruction occurred inside the light control layer at the time of peeling, this case was designated as cohesive failure. Furthermore, when the light control layer remained only on one of the transparent conductive resin substrates, and the light control layer itself was not destroyed at the time of peeling (only the substrate was peeled off), this case was designated as interfacial peeling.

Example 2

A light control film was produced in the same manner as in Example 1, except that an ITO powder (manufactured by Dowa Holdings Co., Ltd., average particle size: 30 nm) and a mixture of pentaerythritol triacrylate and pentaerythritol tetraacrylate (trade name: ARONIX M-305, manufactured by Toagosei Co., Ltd.) were mixed at proportions of 80% by mass and 20% by mass, respectively, and the light control film was evaluated in the same manner as in Example 1. At this time, a photopolymerization initiator (1-hydroxycyclohexyl phenyl ketone) was added in an amount of 3% by mass based on ARONIX M-305. The thickness of the transparent conductive layer after curing was 1.0 µm.

The surface resistivity of the transparent conductive layer was 1800Ω/□.

The light transmittance of the transparent conductive resin substrate was 84%.

Example 3

A light control film was produced in the same manner as in Example 1, except that an ITO powder (manufactured by Dowa Holdings Co., Ltd., average particle size: 30 nm) and a mixture of pentaerythritol triacrylate and pentaerythritol tetraacrylate (trade name: ARONIX M-305, manufactured by Toagosei Co. Ltd.) were mixed at proportions of 85% by mass and 15% by mass, respectively, and the light control film was evaluated in the same manner as in Example 1. At this time, a photopolymerization initiator (1-hydroxycyclohexyl phenyl ketone) was added in an amount of 3% by mass based on ARONIX M-305. The thickness of the transparent conductive layer after curing was 1.1 µm.

The surface resistivity of the transparent conductive layer was 1300Ω/□.

The light transmittance of the transparent conductive resin substrate was 85%.

Comparative Example 1

A light control film was produced in the same manner as in Example 1, except that a PET film (trade name: 300R, manufactured by Toyobo Co., Ltd., thickness 125 µm) coated with a transparent conductive layer of ITO, which had been formed by a gas phase method (sputtering), was used as the transparent conductive resin substrate, and the light control film was evaluated in the same manner as in Example 1.

The surface resistivity of ITO was 300Ω/□.

The light transmittance of ITO was 85%.

Comparative Example 2

A light control film was produced in the same manner as in Example 1, except that an ITO powder (manufactured by Dowa Holdings Co., Ltd., average particle size: 30 nm) and a mixture of pentaerythritol triacrylate and pentaerythritol tetraacrylate (trade name: ARONIX M-305, manufactured by Toagosei Co., Ltd.) were mixed at proportions of 95% by mass and 5% by mass, respectively, and the light control film was evaluated in the same manner as in Example 1. At this time, a photopolymerization initiator (1-hydroxycyclohexyl phenyl ketone) was added in an amount of 3% by mass based on ARONIX M-305. The thickness of the transparent conductive layer after curing was 1.3 µm.

The surface resistivity of the transparent conductive layer was 600Ω/□.

The light transmittance of the transparent conductive resin substrate was 86%.

Comparative Example 3

An ITO powder (trade name: TL-120, manufactured by Catalysts & Chemicals Industries Co., Ltd., average particle size: 30 nm) and a bisphenol AF copolymer phenoxy resin (trade name: ZX1356-2, manufactured by Union Carbide Corp., weight average molecular weight Mw: 62,000) were mixed at proportions of 70% by mass and 30% by mass, and this mixture was dispersed in a solvent mixture of toluene: ethyl acetate=:1. The resulting dispersion was applied on a PET film (COSMOSHINE A4100, manufactured by Toyobo Co., Ltd., thickness 125 µm) as a transparent resin substrate using a bar coater, and was dried at 100° C./5 min. Thus, a transparent conductive resin substrate was obtained. The thickness of the transparent conductive layer after drying was 0.6 µm. A light control film was produced in the same manner as in example 1 using the transparent conductive resin substrate, and the light control film was evaluated in the same manner as in Example 1.

The surface resistivity of the transparent conductive layer was 3200Ω/□.

The light transmittance of the transparent conductive resin substrate was 82%.

TABLE 1

| Item | Surface resistivity (Ω/□) | Radio wave shielding effect (dB) | | | | Adhesive strength (N/m) | Peeling Mode |
|---|---|---|---|---|---|---|---|
| | | 500 MHz | 1 GHz | 2 GHz | 5.8 GHz | | |
| Example 1 | 2400 | 2.2 | 1.5 | 1.4 | 1.4 | 12.6 | Cohesive failure |
| Example 2 | 1800 | 2.7 | 1.6 | 1.5 | 1.5 | 13.3 | Cohesive failure |
| Example 3 | 1300 | 3.6 | 2.7 | 2.6 | 2.6 | 13.9 | Cohesive failure |
| Comparative Example 1 | 300 | 10.8 | 9.1 | 9.0 | 8.5 | 2.1 | Interfacial peeling |
| Comparative Example 2 | 600 | 6.3 | 4.3 | 4.2 | 4.2 | 4.5 | Interfacial peeling |
| Comparative Example 3 | 3200 | 2.0 | 1.3 | 1.3 | 1.3 | 2.5 | Interfacial peeling |

Example 4

A light control film was produced in the same manner as in Example 1, except that an ITO powder (manufactured by Dowa Holdings Co., Ltd., average particle size: 30 nm) and pentaerythritol triacrylate isophorone diisocyanate urethane prepolymer (trade name: UA-3061, manufactured by Kyoeisha Chemical Co., Ltd.) were mixed at proportions of 80% by mass and 20% by mass, respectively, and the light control film was evaluated in the same manner as in Example 1. At this time, a photopolymerization initiator (1-hydroxycyclohexyl phenyl ketone) was added in an amount of 3% by mass based on UA-3061. The thickness of the transparent conductive layer after curing was 1.1 μm.

The surface resistivity of the transparent conductive layer film was 1850Ω/□.

The light transmittance of the transparent conductive resin substrate was 84%.

Example 5

A light control film was produced in the same manner as in Example 1, except that an ITO powder (manufactured by Dowa Holdings Co., Ltd., average particle size: 30 nm) and 2-methacryloyloxyethyl acid phosphate (trade name: P-2M, manufactured by Kyoeisha Chemical Co., Ltd.) were mixed at proportions of 80% by mass and 20% by mass, respectively, and the light control film was evaluated in the same manner as in Example 1. At this time, a photopolymerization initiator (1-hydroxycyclohexyl phenyl ketone) was added in an amount of 3% by mass based on P-2M. The thickness of the transparent conductive layer after curing was 1.1 μm.

The surface resistivity of the transparent conductive layer was 1900Ω/□.

The light transmittance of the transparent conductive resin substrate was 85%.

TABLE 2

| Item | Surface resistivity (Ω/□) | Radio wave shielding effect (dB) | | | | Adhesive strength (N/m) | Peeling Mode |
|---|---|---|---|---|---|---|---|
| | | 500 MHz | 1 GHz | 2 GHz | 5.8 GHz | | |
| Example 4 | 1850 | 2.7 | 1.5 | 1.5 | 1.5 | 11.5 | Cohesive failure |
| Example 5 | 1900 | 2.6 | 1.5 | 1.5 | 1.4 | 14.3 | Cohesive failure |

As shown in Table 1 and Table 2, in Examples 1 to 5, the radio wave shielding property in the frequency band of 500 MHz or higher was 5 dB or less, and the radio wave transparency could be enhanced to a large extent.

Meanwhile, in Comparative Examples 1 and 2, the radio wave shielding property at 500 MHz was 5 dB or greater, and the radio wave transparency was low.

Furthermore, in Comparative Examples 1 to 3, the adhesive strength was markedly low, and also, peeling occurred at the interface between the transparent conductive resin substrate and the light control film.

On the contrary, in the Examples, the adhesive strength was enhanced to a large extent in all cases, and peeling also occurred in a cohesive failure mode, so that adhesiveness could be enhanced to a large extent while maintaining the light control characteristics.

Example 6

A light control film was produced in the same manner as in Example 1, except that an ITO powder (manufactured by Dowa Holdings Co., Ltd., average particle size: 30 nm) and an acrylic acid adduct of glycerin diglycidyl ether (trade name: EPOXY ESTER 80MFA, manufactured by Kyoeisha Chemical Co., Ltd.) were mixed at proportions of 85% by mass and 25% by mass, respectively, and the light control film was evaluated in the same manner as in Example 1. At this time, a photopolymerization initiator (1-hydroxycyclohexyl phenyl ketone) was added in an amount of 3% by mass based on 80MFA. The thickness of the transparent conductive layer after curing was 1.0 μm.

The surface resistivity of the transparent conductive layer was 2600Ω/□.

The light transmittance of the transparent conductive resin substrate was 82%.

Example 7

A light control film was produced in the same manner as in Example 1, except that an ITO powder (manufactured by Dowa Holdings Co., Ltd., average particle size: 30 nm) and an acrylic acid adduct of glycerin diglycidyl ether (trade name: EPOXY ESTER 80MFA, manufactured by Kyoeisha Chemical Co., Ltd.) were mixed at proportions of 80% by mass and 20% by mass, respectively, and the light control film was evaluated in the same manner as in Example 1. At this time, a photopolymerization initiator (1-hydroxycyclohexyl phenyl ketone) was added in an amount of 3% by mass based on 80MFA. The thickness of the transparent conductive layer after curing was 1.0 μm.

The surface resistivity of the transparent conductive layer was 1950Ω/□. The light transmittance of the transparent conductive resin substrate was 84%.

Example 8

A light control film was produced in the same manner as in Example 1, except that an ITO powder (manufactured by Dowa Holdings Co., Ltd., average particle size: 30 nm) and an acrylic acid adduct of propylene glycol diglycidyl ether (trade name: EPOXY ESTER 70PA, manufactured by Kyoeisha Chemical Co., Ltd.) were mixed at proportions of 85% by mass and 25% by mass, respectively, and the light control film was evaluated in the same manner as in Example 1. At this time, a photopolymerization initiator (1-hydroxycyclohexyl phenyl ketone) was added in an amount of 3% by mass based on 70PA. The thickness of the transparent conductive layer after curing was 1.0 µm.

The surface resistivity of the transparent conductive layer was 2550Ω/□.

The light transmittance of the transparent conductive resin substrate was 83%.

Example 9

A light control film was produced in the same manner as in Example 1, except that an ITO powder (manufactured by Dowa Holdings Co., Ltd., average particle size: 30 nm) and an acrylic acid adduct of propylene glycol diglycidyl ether (trade name: EPOXY ESTER 70PA, manufactured by Kyoeisha Chemical Co., Ltd.) were mixed at proportions of 80% by mass and 20% by mass, respectively, and the light control film was evaluated in the same manner as in Example 1. At this time, a photopolymerization initiator (1-hydroxycyclohexyl phenyl ketone) was added in an amount of 3% by mass based on 70PA. The thickness of the transparent conductive layer after curing was 1.0 µm.

The surface resistivity of the transparent conductive layer was 1900Ω/□.

The light transmittance of the transparent conductive resin substrate was 85%.

TABLE 3

| Item | Surface resistivity (Ω/□) | Radio wave shielding effect (dB) | | | | Adhesive strength (N/m) | Peeling Mode |
| --- | --- | --- | --- | --- | --- | --- | --- |
| | | 500 MHz | 1 GHz | 2 GHz | 5.8 GHz | | |
| Example 6 | 2600 | 2.0 | 1.3 | 1.2 | 1.2 | 10.8 | Cohesive failure |
| Example 7 | 1950 | 2.5 | 1.4 | 1.3 | 1.3 | 11.1 | Cohesive failure |
| Example 8 | 2550 | 2.1 | 1.3 | 1.2 | 1.2 | 11.4 | Cohesive failure |
| Example 9 | 1900 | 2.5 | 1.4 | 1.3 | 1.3 | 10.7 | Cohesive failure |

As shown in Table 3, in Examples 6 to 9, the radio wave shielding property in the frequency band of 500 MHz or higher was 5 dB or less, and the radio wave transparency could be enhanced to a large extent. Furthermore, the adhesive strength was high, peeling occurred in a cohesive failure mode, and adhesiveness could be enhanced to a large extent while maintaining the light control performance.

INDUSTRIAL APPLICABILITY

According to the present invention, a light control film having excellent radio wave transparency and excellent adhesiveness between the transparent conductive layer and the transparent resin substrate of the transparent conductive resin substrate, can be provided.

| REFERENCE SIGNS LIST | |
| --- | --- |
| 1 | Light control layer |
| 2 | Resin matrix |
| 3 | Liquid droplet |
| 4 | Transparent conductive resin substrate |
| 5a | Transparent conductive layer |
| 5b | Transparent resin substrate |
| 7 | Power source |
| 8 | Switch |
| 9 | Dispersion medium |
| 10 | Light control particle |
| 11 | Incident light rays |
| 12 | Surface of transparent conductive layer exposed by removing light control layer |
| 13 | Wire for applying voltage to transparent conductive layer |

The invention claimed is:

1. A light control film comprising: two of transparent conductive resin substrates each having a transparent conductive layer and a transparent resin substrate; and a light control layer interposed between the two transparent conductive resin substrates to be in contact with the transparent conductive layer sides,
   the light control layer containing: a resin matrix; and a light control suspension dispersed in the resin matrix,
   wherein: the transparent conductive layer contains an organic binder resin, and conductive particles dispersed in the organic binder resin,
   the mass ratio of the organic binder resin and the conductive particles is 50/50 to 10/90, and
   the entirety or a portion of the organic binder resin is composed of (meth)acrylate containing a hydroxyl group.

2. The light control film according to claim 1, wherein the conductive particles are at least one selected from the group of consisting of ITO, GZO, ZnO and Al-doped $SnO_2$.

3. The light control film according to claim 1, wherein the organic binder resin is a resin obtainable by curing a polymerizable monomer or a polymerizable oligomer with heat or light.

4. The light control film according to claim 1, wherein the entirety or a portion of the organic binder resin is composed of urethane acrylate containing a pentaerythritol skeleton.

5. The light control film according to claim 1, wherein the transparent conductive layer is formed from a transparent conductive layer having a surface resistivity value of 1000Ω/□ or greater.

6. The light control film according to claim 1, wherein the radio wave shielding property in the frequency band of 500 MHz or higher is 5 dB or less.

* * * * *